United States Patent
Foster

(10) Patent No.: US 10,719,797 B2
(45) Date of Patent: Jul. 21, 2020

(54) METHOD OF TRACKING AND REPORTING ENERGY PERFORMANCE FOR BUSINESSES

(71) Applicant: OPOWER, Inc., Arlington, VA (US)

(72) Inventor: Benjamin David Foster, Arlington, VA (US)

(73) Assignee: OPOWER, Inc., Redwood Shores, CA (US)

(*) Notice: Subject to any disclaimer, the term of this patent is extended or adjusted under 35 U.S.C. 154(b) by 881 days.

(21) Appl. No.: 14/253,258

(22) Filed: Apr. 15, 2014

(65) Prior Publication Data

US 2014/0337107 A1   Nov. 13, 2014

Related U.S. Application Data

(60) Provisional application No. 61/822,067, filed on May 10, 2013.

(51) Int. Cl.
  *G06Q 10/06* (2012.01)
  *G06Q 50/06* (2012.01)

(52) U.S. Cl.
  CPC ....... *G06Q 10/06395* (2013.01); *G06Q 50/06* (2013.01); *Y02P 90/82* (2015.11); *Y02P 90/84* (2015.11)

(58) Field of Classification Search
  CPC ............. G06Q 10/06395; G06Q 50/06; G06Q 10/067; G06Q 10/0639; G06Q 10/06393
  See application file for complete search history.

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Tyler W Knox
(74) *Attorney, Agent, or Firm* — Kraguljac Law Group, LLC

(57) ABSTRACT

Methods and computer systems report and track resource performance for business customers. The computer system receives usage data about a resource associated with a customer of a utility, including hourly usage information about the resource metered at a business premises of the customer. The computer system receives operational data associated with the business premises, including hours of operations information describing when the business premises is open to patrons. The computer system determines resource performance data for the business premises using the received usage data and the received operational data, including information about: (i) resource usage at the business premises during the hours when open to patrons, and (ii) resource usage at the business premises during the hours when closed to patrons. The computer system causes a reporting of this information to the customer of the resource.

22 Claims, 14 Drawing Sheets

(56) References Cited

U.S. PATENT DOCUMENTS

| | | | |
|---|---|---|---|
| 5,513,519 A | 5/1996 | Cauger et al. | |
| 5,566,084 A * | 10/1996 | Cmar | G05D 23/1902 |
| | | | 700/276 |
| 5,717,609 A | 2/1998 | Packa et al. | |
| 5,758,331 A * | 5/1998 | Johnson | G06Q 30/02 |
| | | | 705/412 |
| 5,855,011 A | 12/1998 | Tatsuoka | |
| 5,873,251 A | 2/1999 | Iino | |
| 5,930,773 A | 7/1999 | Crooks et al. | 705/30 |
| 5,930,803 A | 7/1999 | Becker et al. | |
| 5,948,303 A | 9/1999 | Larson | |
| 6,035,285 A | 3/2000 | Schlect et al. | 705/30 |
| 6,088,688 A | 7/2000 | Crooks et al. | 705/412 |
| 6,295,504 B1 | 9/2001 | Ye et al. | |
| 6,327,605 B2 | 12/2001 | Arakawa et al. | |
| D462,077 S | 8/2002 | Greminger | |
| 6,606,104 B1 | 8/2003 | Kondo et al. | |
| 6,701,298 B1 * | 3/2004 | Jutsen | G01R 21/133 |
| | | | 705/7.39 |
| 6,732,055 B2 | 5/2004 | Bagepalli et al. | |
| 6,778,945 B2 | 8/2004 | Chassin et al. | |
| 6,785,620 B2 | 8/2004 | Kishlock et al. | |
| 6,972,660 B1 | 12/2005 | Montgomery, Jr. et al. | |
| 6,988,092 B1 * | 1/2006 | Tang | G06Q 10/06 |
| | | | 705/7.39 |
| 7,020,508 B2 | 3/2006 | Stivoric et al. | |
| 7,073,073 B1 | 7/2006 | Nonaka et al. | |
| 7,073,075 B2 | 7/2006 | Freyman et al. | |
| 7,136,710 B1 | 11/2006 | Hoffberg et al. | |
| 7,142,949 B2 | 11/2006 | Brewster et al. | |
| 7,149,727 B1 | 12/2006 | Nicholls et al. | |
| 7,200,468 B2 | 4/2007 | Ruhnke et al. | |
| 7,233,843 B2 * | 6/2007 | Budhraja | H02J 13/0093 |
| | | | 700/291 |
| 7,243,044 B2 | 7/2007 | McCalla | |
| 7,333,880 B2 | 2/2008 | Brewster et al. | |
| 7,356,548 B1 | 4/2008 | Culp et al. | |
| 7,444,251 B2 | 10/2008 | Nikovski et al. | |
| 7,460,502 B2 | 12/2008 | Arima et al. | |
| 7,460,899 B2 | 12/2008 | Almen | |
| 7,552,030 B2 | 6/2009 | Guralnik et al. | |
| 7,561,977 B2 | 7/2009 | Horst et al. | |
| 7,617,136 B1 * | 11/2009 | Lessing | G06Q 10/087 |
| | | | 705/22 |
| D605,652 S | 12/2009 | Plaisted et al. | |
| 7,878,890 B2 | 2/2011 | Toyohara et al. | |
| 7,991,513 B2 | 8/2011 | Pitt | |
| 8,065,098 B2 | 11/2011 | Gautam | |
| 8,166,047 B1 | 4/2012 | Cohen et al. | |
| D660,867 S | 5/2012 | Marchetti | |
| 8,180,591 B2 | 5/2012 | Yuen et al. | |
| D665,411 S | 8/2012 | Rai et al. | |
| 8,239,178 B2 | 8/2012 | Gray et al. | |
| D667,841 S | 9/2012 | Rai et al. | |
| 8,260,468 B2 | 9/2012 | Ippolito et al. | |
| 8,275,635 B2 | 9/2012 | Stivoric et al. | |
| 8,280,536 B1 | 10/2012 | Fadell et al. | |
| D671,550 S | 11/2012 | Chen et al. | |
| 8,348,840 B2 | 1/2013 | Heit et al. | |
| 8,375,118 B2 | 2/2013 | Hao et al. | |
| 8,417,061 B2 | 4/2013 | Kennedy et al. | |
| 8,428,785 B2 | 4/2013 | Boucher et al. | |
| 8,429,630 B2 | 4/2013 | Nickolov et al. | |
| 8,478,447 B2 | 7/2013 | Fadell et al. | |
| 8,489,245 B2 | 7/2013 | Carrel et al. | |
| D687,445 S | 8/2013 | Fuhrmann | |
| D694,252 S | 11/2013 | Helm | |
| 8,583,288 B1 | 11/2013 | Rossi et al. | |
| 8,606,664 B2 * | 12/2013 | Carter | G06Q 10/067 |
| | | | 705/30 |
| D697,526 S | 1/2014 | Bruck et al. | |
| 8,630,741 B1 | 1/2014 | Matsuoka et al. | |
| 8,630,884 B2 * | 1/2014 | Carter | G06Q 10/067 |
| | | | 705/7.11 |
| 8,660,813 B2 | 2/2014 | Curtis et al. | |
| D703,690 S | 4/2014 | MacCubbin et al. | |
| 8,690,751 B2 | 4/2014 | Auphan | |
| D707,245 S | 6/2014 | Bruck et al. | |
| 8,751,432 B2 | 6/2014 | Berg-Sonne et al. | |
| D710,871 S | 8/2014 | McCormack et al. | |
| 8,805,000 B2 | 8/2014 | Derby et al. | |
| 8,818,758 B1 | 8/2014 | Singh et al. | |
| D714,335 S | 9/2014 | Cojuangco et al. | |
| 8,825,662 B1 * | 9/2014 | Kingman | G06Q 30/0251 |
| | | | 707/741 |
| 8,868,248 B2 | 10/2014 | Park | |
| D717,328 S | 11/2014 | Lin | |
| D720,767 S | 1/2015 | Miller et al. | |
| 8,954,849 B2 | 2/2015 | Doi et al. | |
| D725,133 S | 3/2015 | Smirin et al. | |
| D725,664 S | 3/2015 | Nies et al. | |
| D729,268 S | 5/2015 | Nies et al. | |
| D730,386 S | 5/2015 | Ryan et al. | |
| 9,031,703 B2 | 5/2015 | Nakamura et al. | |
| D731,538 S | 6/2015 | Lee | |
| D732,049 S | 6/2015 | Amin | |
| D732,062 S | 6/2015 | Kwon | |
| D740,847 S | 10/2015 | Yampolskiy et al. | |
| 2001/0047290 A1 | 11/2001 | Petras et al. | |
| 2002/0065581 A1 | 5/2002 | Fasca | |
| 2002/0178047 A1 * | 11/2002 | Or | G06Q 10/04 |
| | | | 705/412 |
| 2002/0198629 A1 * | 12/2002 | Ellis | G06Q 10/06 |
| | | | 700/286 |
| 2003/0009401 A1 * | 1/2003 | Ellis | G06Q 30/0283 |
| | | | 705/35 |
| 2003/0011486 A1 | 1/2003 | Ying | |
| 2003/0018517 A1 | 1/2003 | Dull et al. | |
| 2003/0023467 A1 | 1/2003 | Moldovan | |
| 2003/0023540 A2 * | 1/2003 | Johnson | G06Q 10/04 |
| | | | 705/37 |
| 2003/0216971 A1 | 11/2003 | Sick et al. | |
| 2004/0024717 A1 * | 2/2004 | Sneeringer | G06Q 30/0283 |
| | | | 705/412 |
| 2004/0111410 A1 | 6/2004 | Burgoon et al. | |
| 2004/0140908 A1 | 7/2004 | Gladwin et al. | |
| 2004/0177002 A1 * | 9/2004 | Abelow | G06Q 10/0639 |
| | | | 705/14.19 |
| 2005/0171877 A1 * | 8/2005 | Weiss | G06Q 30/02 |
| | | | 705/35 |
| 2005/0257540 A1 | 11/2005 | Choi et al. | |
| 2006/0089851 A1 | 4/2006 | Silby et al. | |
| 2006/0093222 A1 | 5/2006 | Saffer et al. | |
| 2006/0103549 A1 | 5/2006 | Hunt et al. | |
| 2006/0195438 A1 | 8/2006 | Galuten | |
| 2006/0246968 A1 | 11/2006 | Dyke-Wells | |
| 2007/0061735 A1 | 3/2007 | Hoffberg et al. | |
| 2007/0067207 A1 * | 3/2007 | Haggerty | G06Q 10/0639 |
| | | | 705/7.29 |
| 2007/0185835 A1 | 8/2007 | Ursitti et al. | |
| 2007/0198459 A1 | 8/2007 | Boone et al. | |
| 2007/0203860 A1 | 8/2007 | Golden et al. | |
| 2007/0213992 A1 | 9/2007 | Anderson et al. | |
| 2007/0255457 A1 | 11/2007 | Whitcomb et al. | |
| 2007/0260405 A1 | 11/2007 | McConnell et al. | |
| 2008/0015871 A1 * | 1/2008 | Eder | G06Q 10/067 |
| | | | 706/21 |
| 2008/0027885 A1 | 1/2008 | van Putten et al. | |
| 2008/0033587 A1 | 2/2008 | Kurita et al. | |
| 2008/0167535 A1 | 7/2008 | Stivoric et al. | |
| 2008/0189632 A1 | 8/2008 | Tien et al. | |
| 2008/0195561 A1 | 8/2008 | Herzig | |
| 2008/0222561 A1 | 9/2008 | Helfman et al. | |
| 2008/0228540 A1 * | 9/2008 | Megdal | G06Q 30/0204 |
| | | | 705/7.33 |
| 2008/0244429 A1 | 10/2008 | Stading | |
| 2008/0281473 A1 | 11/2008 | Pitt | |
| 2008/0281763 A1 | 11/2008 | Yliniemi | |
| 2008/0304112 A1 | 12/2008 | Matsuno | |
| 2008/0306985 A1 | 12/2008 | Murray et al. | |
| 2009/0018891 A1 * | 1/2009 | Eder | G06Q 10/06 |
| | | | 705/7.28 |

(56) References Cited

U.S. PATENT DOCUMENTS

| | | | |
|---|---|---|---|
| 2009/0106202 A1 | 4/2009 | Mizrahi | |
| 2009/0106674 A1 | 4/2009 | Bray et al. | |
| 2009/0204267 A1 | 8/2009 | Sustaeta et al. | |
| 2009/0217175 A1 | 8/2009 | Bechtel et al. | |
| 2009/0217179 A1 | 8/2009 | Mons et al. | |
| 2009/0326726 A1 | 12/2009 | Ippolito et al. | |
| 2010/0025483 A1 | 2/2010 | Hoeynck et al. | |
| 2010/0070102 A1* | 3/2010 | Benes | G06Q 30/02 700/296 |
| 2010/0076835 A1* | 3/2010 | Silverman | G06Q 10/06 705/14.33 |
| 2010/0082174 A1 | 4/2010 | Weaver | |
| 2010/0099954 A1 | 4/2010 | Dickinson et al. | |
| 2010/0106575 A1 | 4/2010 | Bixby et al. | |
| 2010/0138363 A1 | 6/2010 | Batterberry et al. | |
| 2010/0156665 A1 | 6/2010 | Krzyzanowski et al. | |
| 2010/0179704 A1* | 7/2010 | Ozog | G06Q 50/06 700/291 |
| 2010/0180223 A1 | 7/2010 | Speier | |
| 2010/0198713 A1 | 8/2010 | Forbes, Jr. et al. | |
| 2010/0211443 A1* | 8/2010 | Carrel | G06Q 30/0208 705/14.11 |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1* | 8/2010 | Crabtree | G06Q 10/00 705/7.22 |
| 2010/0218108 A1* | 8/2010 | Crabtree | G06Q 50/06 715/738 |
| 2010/0232671 A1 | 9/2010 | Dam et al. | |
| 2010/0241648 A1 | 9/2010 | Ito et al. | |
| 2010/0286937 A1* | 11/2010 | Hedley | G06Q 30/02 702/60 |
| 2010/0289643 A1* | 11/2010 | Trundle | F24F 11/30 340/545.1 |
| 2010/0324962 A1* | 12/2010 | Nesler | G06Q 30/0202 705/7.36 |
| 2010/0332373 A1* | 12/2010 | Crabtree | G06Q 40/04 705/37 |
| 2011/0022429 A1* | 1/2011 | Yates | G06Q 10/00 705/313 |
| 2011/0023045 A1* | 1/2011 | Yates | G06Q 10/063114 718/104 |
| 2011/0040666 A1* | 2/2011 | Crabtree | G06Q 30/0283 705/37 |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | 702/62 |
| 2011/0153102 A1 | 6/2011 | Tyagi et al. | |
| 2011/0161137 A1* | 6/2011 | Ubalde | G06Q 30/0205 705/7.34 |
| 2011/0166913 A1* | 7/2011 | Buchanan | G06Q 10/06 705/7.39 |
| 2011/0178842 A1 | 7/2011 | Rane et al. | |
| 2011/0178937 A1 | 7/2011 | Bowman | |
| 2011/0184581 A1* | 7/2011 | Storch | G06Q 10/06 700/295 |
| 2011/0184766 A1* | 7/2011 | Virdhagriswaran | G06Q 10/067 705/4 |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | 700/291 |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0166616 A1* | 6/2012 | Meehan | G06Q 50/06 709/224 |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | 705/7.36 |
| 2012/0290230 A1 | 11/2012 | Berges Gonzalez et al. | |
| 2012/0310708 A1* | 12/2012 | Curtis | G06Q 30/0201 705/7.33 |
| 2013/0060531 A1 | 3/2013 | Burke et al. | 703/1 |
| 2013/0060720 A1 | 3/2013 | Burke | 705/412 |
| 2013/0080210 A1* | 3/2013 | Vogel | G06Q 10/06 705/7.33 |
| 2013/0097177 A1 | 4/2013 | Fan et al. | |
| 2013/0097481 A1 | 4/2013 | Kotler et al. | |
| 2013/0173064 A1 | 7/2013 | Fadell et al. | |
| 2013/0211660 A1* | 8/2013 | Mitchell | G08G 1/127 701/29.3 |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2013/0346161 A1* | 12/2013 | Mayerle | G06Q 10/06 705/7.39 |
| 2013/0346229 A1* | 12/2013 | Martin | G06Q 50/06 705/26.3 |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | 700/291 |
| 2014/0142905 A1* | 5/2014 | Drees | G06Q 10/06 703/2 |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0300831 A1 | 10/2015 | Sernicola | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0319119 A1 | 11/2015 | Ryu et al. | |
| 2015/0324819 A1 | 11/2015 | Lin et al. | |
| 2015/0326679 A1 | 11/2015 | Lin et al. | |

FOREIGN PATENT DOCUMENTS

| | | | |
|---|---|---|---|
| CA | 2832211 | 11/2012 | |
| DE | 3703387 | 8/1987 | |
| DE | 102011077522 | 12/2012 | |
| EP | 0003010 | 7/1979 | |
| EP | 2705440 | 3/2014 | |
| EP | 2496991 | 9/2014 | |
| GB | 1525656 | 9/1978 | |
| GB | 2238405 | 5/1991 | |
| JP | 2000-270379 | 9/2000 | H04Q 9/00 |
| JP | 2000-270379 A | 9/2000 | |
| JP | 2000270379 A * | 9/2000 | |
| JP | 2004-233118 | 8/2004 | |
| JP | 2005-158020 A | 6/2005 | |
| JP | 2005158020 A * | 6/2005 | |
| JP | 2006-119931 | 5/2006 | G06Q 50/00 |
| JP | 2007-041322 A | 2/2007 | |
| JP | 2007-133468 | 5/2007 | |
| JP | 2008-033811 A | 2/2008 | |
| JP | 2008033811 A * | 2/2008 | |
| JP | 2008-546073 A | 12/2008 | |
| JP | 2011-027305 | 2/2011 | |
| JP | 2011-129067 A | 6/2011 | |
| JP | 2011129067 A * | 6/2011 | G06Q 50/06 |
| JP | 2012-080679 | 4/2012 | |
| JP | 2012-080681 | 4/2012 | |
| JP | 2012-216082 A | 11/2012 | |
| JP | 2013-020307 | 1/2013 | G06Q 50/16 |
| WO | WO-0227616 A1 * | 4/2002 | G06Q 30/02 |

(56) References Cited

FOREIGN PATENT DOCUMENTS

| | | | |
|---|---|---|---|
| WO | WO 0227616 A1 * | 4/2002 | ........... G06N 99/005 |
| WO | WO 0227621 A1 * | 4/2002 | ........... G06N 99/005 |
| WO | WO 03/102865 | 12/2003 | |
| WO | WO 03/104941 | 12/2003 | |
| WO | WO 2008/101248 | 8/2008 | |
| WO | WO 2009/085610 | 7/2009 | |
| WO | WO-2011031795 A1 * | 3/2011 | ............. G06Q 10/06 |
| WO | WO 2011/057072 | 5/2011 | |
| WO | WO 2012/112358 | 8/2012 | |
| WO | WO 2012/154566 | 11/2012 | |
| WO | WO2013/063088 A | 5/2013 | |
| WO | WO-2013063088 A2 * | 5/2013 | ......... G06F 16/9535 |
| WO | WO 2014/004148 | 1/2014 | |
| WO | WO 2014/182656 | 11/2014 | |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.

Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date Aug. 18, 2015, available at http://notamystery.com/2015/04/18/not_worth_the_papeUts_printed_on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower>.
Laskey, Alex, et al., "OPOWER," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting—Calculate and Categorize your spending, https://www.mint.com/how-it-works/budgeting/, 2 pages, Jul. 12, 2013.

(56) References Cited

OTHER PUBLICATIONS

Mint.com, "We're always on alert." Alerts for bills, fees & going over budget, https://www.mint.com/how-it-works/alerts/, 2 pages, Jul. 12, 2013.

Morabito, Kerri, "High User Campaign," posted at Kerri Morabito, posting date not given, © Kerri Morabito, 2015, available at <URL: http://www.kerrimorabito.com/high-user-campaign.html>.

Mori, Hiroyuki, "State-of-the-Art Overview on Data Mining in Power Systems," IEEE, pp. 33-37, 2006.

Muthen, Bengt, et al., Finite Mixture Modeling with Mixture Outcomes Using the EM Algorithm, Biometrics, vol. 55, pp. 463-469, Jun. 1999.

NEST, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f_.uelband. 7 pages, Jul. 15, 2013.

Rocheleau, Jake, "38 Amazingly Well-Designed Emoji Iconsets," posted at SpyreStudios, posting date Mar. 25, 2015, SpyreStudios © 2015, available at http://spyrestudios.com/38/welldesignedemojiconsets/>.

Rose, O. "Estimation of the Hurst Parameter of Long-Range Dependent Time Series," University of Wuirzburg, Institute of Computer Science, Research Report Series, Report No. 137, 15 pages, Feb. 1996.

Sawka, Michael N., et al., "Human Adaptations to Heat and Cold Stress," RTOMP-076, 16 pages, Oct. 2001.

Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.

Stoop, R., et al., "Calculation of Lyapunov exponents avoiding spurious elements," Physica D 50, pp. 89-94, May 1991.

Wang, Xiaozhe, et al. "Rule induction for forecasting method selection: meta-learning the characteristics of univariate time series," Faculty of information Technology, Department of Econometrics and Business Statistics, Monash University, pp. 1-34.

Wang, Xiaozhe, et al., "Characteristic-Based Clustering for Time Series Data," Data Mining and Knowledge Discovery, Springer Science & Business Media, LLC, vol. 13, pp. 335-364 (2006).

Wehrens, Ron, et al. "Self- and Super-organizing Maps in R: The kohonen Package," Journal of Statistical Software, vol. 21, Iss. 5, pp. 1-19, Oct. 2007.

Wikipedia, "Akaike information criterion," 6 pages, Aug. 17, 2012.

Wikipedia, "Mixture model," 10 pages, Oct. 7, 2012.

International Searching Authority, International Search Report—International Application No. PCT/US2014/036901, dated Aug. 28, 2014, together with the Written Opinion of the International Searching Authority, 11 pages.

Ryosuke Shibasaki, Smart Sensing of Urban Environment, Journal of the Society of Instrument and Control Engineers, The Society of Instrument and Control Engineers, Nov. 10, 2012, vol. 52, No. 11, pp. 946-952.

Tetsuji Shinkai, Energy Management System for Retail Stores, Fuji Electric Journal, Fuji Electric Co., Ltd., May 10, 2011, vol. 84, No. 3, pp. 219-223.

CA Office Action in co-pending Canadian Application No. 2910236, filing date May 6, 2014, dated Mar. 14, 2018.

JP Office Action dated Nov. 20, 2018 for co-pending JP Patent Application No. 2016513003 filed Nov. 6, 2015.

\* cited by examiner

— 568

Who are similar business premises?

Where is your business located?  
                                                                   Urban  Rural Type of Business    [ Category ▼ ]

[ Sub-category ▼ ]

Do you have a NAICS or SIC code?   [ Code ]

How many employees work on your premises?   [ Less than 10 ]

Do you own or lease?  
                                  Lease  Own Do you have gas heating?  
                                    Yes  No What are your business hours?   [ Time ]

*Add day*

Who are similar business premises?

How many businesses would you like to use for your analysis?

| Iteration | Categories | | Similar Business Premises |
|---|---|---|---|
| 1 | Urban/Suburban | Rural | 25 |
| | Type of Business | Pizzeria | |
| | Heating Type | Gas | |
| | Size of business | Less than 10 employees | |
| | Proximity | Within 20 miles | |
| | Own vs. lease | Lease | |

| Iteration | Categories | | Similar Business Premises |
|---|---|---|---|
| 2 | Urban/Suburban | Rural | 25 + [3] = 28 |
| | Type of Business | Pizzeria + Donut Shops | |
| | Heating Type | Gas | |
| | Size of business | Less than 10 employees | |
| | Proximity | Within 20 miles + 30 addition miles | |
| | Own vs. lease | Lease | |

| Iteration | Categories | | Similar Business Premises |
|---|---|---|---|
| 3 | Urban/Suburban | Urban | 25 + [10] = 35 |
| | Type of Business | Pizzeria + Donut Shops | |
| | Heating Type | Gas | |
| | Size of business | Less than 10 employees | |
| | Proximity | Within 20 miles | |
| | Own vs. lease | Lease | |

| Iteration | Categories | | Similar Business Premises |
|---|---|---|---|
| 4 | Urban/Suburban | Urban | 35 + [19] = 54 |
| | Type of Business | Pizzeria + Donut Shops + Take-out food service | |
| | Heating Type | Gas | |
| | Size of business | Less than 10 employees | |
| | Proximity | Within 20 miles | |
| | Own vs. lease | Lease | |

Fig. 8

METHOD OF TRACKING AND REPORTING ENERGY PERFORMANCE FOR BUSINESSES

CROSS REFERENCE TO RELATED APPLICATIONS

This application claims the benefit of U.S. Provisional Patent Application No. 61/822,067, filed May 10, 2013, titled "Method of Tracking and Reporting Energy Performance for Businesses," the entire contents of which are hereby incorporated by reference herein, for all purposes.

TECHNICAL FIELD

The present invention relates to energy usage, and more particularly to tracking and reporting energy performance for businesses.

BACKGROUND ART

It is generally known to track energy performance of a business to reduce energy usage and to reduce business expenses relating to the usage of the energy. There are commercially available services and energy management solutions to track the energy performance for businesses. Such services or systems are generally procured by an owner or manager of the business. As such, a business would only benefit once the business initiates the effort to track its energy performance.

There is a benefit for a utility to initiate energy reduction efforts for businesses.

SUMMARY OF EMBODIMENTS

An embodiment of the present invention provides a computer-implemented method of tracking resource performance for business customers. Operations of the method may be implemented by a processor. The method includes receiving, by a processor, usage data describing usage of a resource associated with a customer of a utility that provides the resource to the customer. The usage data includes information about usage of the resource for a plurality of contiguous periods of time. Each period of time is less than about six hours. For example, the time period may be about one hour. The usage data has been metered at a business premises of the customer. A processor receives operational data describing operation of the business premises. The operational data includes information describing times of day when the business premises is open to patrons. The times of day may be expressed in hours, minutes, portions of the day or any other suitable units.

A processor determines resource performance data for the business premises using the received usage data and the received operational data. The resource performance data includes information about: (i) resource usage at the business premises during the times of day when open to patrons, and (ii) resource usage at the business premises during times of day when closed to patrons. A processor generates a report to the customer of the resource performance data.

The resource performance data may further include a comparison of the resource usage at the business premises between the times of day when open to patrons and the times of day when closed to patrons.

Receiving the operational data may include receiving the operational data from a local directory service provider, deriving the operational data from an electronic publication of the business, receiving the operational data from a source that has derived the operational data from a publication of the business, receiving the operational data from a third-party service provider who maintains a database of the hours of operation of the business premises, or determining the operational data, including the information describing the times of day of operations when the business premises is open to patrons, based on the received usage data.

The method may also include receiving, by a processor, resource performance data for similar business premises. A processor causes a reporting to the customer of the resource performance data for the similar premises in conjunction with the resource performance data of the customer.

The method may also include receiving, by a processor, pricing data for the resource. The pricing data may include: information about a first price of the resource, a first set of times of day associated with the first resource price, a second price of the resource that is higher than the first price, and a second set of times of day associated with the second resource price. A processor may determine an elevated pricing time based on the pricing data and the operational data. The elevated pricing time may be a time of day when the business premises is open to patrons overlaps with the times of day associated with the second resource price. A processor may estimate savings that may be realized if a predefined portion of the usage of the resource during the elevated pricing time were moved to a time of day when the premises is closed to patrons. A processor may generate a report to the customer of the estimated savings, in conjunction with the report to the customer of the resource performance data.

The usage data may include electricity usage data, gas usage data, oil usage data, wood usage data, waste removal usage data, water usage data, sewer usage data, garbage removal usage data, recycling removal usage data, telephone usage data and/or broadband usage data.

Each period of time may be no greater than about one hour.

Another embodiment of the present invention provides a computerized method for reporting resource usage by a customer of a utility that provides the resource to the customer. The method includes receiving, by a processor, characteristic data describing a first business premises. The characteristic data includes at least one specialty classification of the first business premises. The method also includes receiving, by a processor, characteristic data describing a plurality of second business premises. The characteristic data includes at least one respective specialty classification of each business premises of the plurality of second business premises. The method also includes receiving, by a processor, usage data describing usage of the resource by at least some of the plurality of second business premises. The resource is provided by a utility.

A processor selects, from the plurality of second business premises, a plurality of selected second business premises. Each selected second business premises has a first specialty classification equal to a first specialty classification of the first business premises. If a number of the plurality of selected second business premises is less than a predetermined value, a processor augments the plurality of selected second business premises with additional selected business premises. The additional selected business premises are selected from the plurality of second business premises. Each additional selected business premises has a second specialty classification equal to a second specialty classification of the first business premises. The second specialty classification is different than the first specialty classification.

A processor generates a report that includes usage data describing usage of the resource by the first business premises and usage data describing usage of the resource by at least one business premises of the plurality of selected second business premises.

The first specialty classification may correspond to a first market characteristic, and the second specialty classification may correspond to a second, different, market characteristic.

The first specialty classification may correspond to a first NAICS code, and the second specialty classification may correspond to a second, different, NAICS code.

The first specialty classification may correspond to a first SIC code, and the second specialty classification may corresponds to a second, different, SIC code.

The first specialty classification may correspond to a first sub-specialty classification, and the second specialty classification may correspond to a second, different, sub-specialty classification. The first specialty classification may be hierarchically related to the first sub-specialty classification.

Optionally, a processor may select, from the plurality of second business premises, a plurality of selected second business premises, such that each selected second business premises is similar, according to at least one criterion, to the first business premises. Similarity may be defined, for each criterion of the at least one criterion, as: (i) a match between a characteristic of the selected second business premises and a characteristic of the first business premises and/or (i) match between a characteristic of the selected second business premises and a range, where the range is determined by a processor, based on at least one characteristic of the first business premises. If the number of the plurality of selected second business premises is less than the predetermined value, a processor may relax at least one of the at least one criterion, such as by removing a criterion from the at least one criterion and/or increasing at least one range of the at least one criterion.

The predetermined value may be 1.

The usage data may include at least one of electricity usage data, gas usage data, oil usage data, wood usage data, waste removal usage data, water usage data, sewer usage data, garbage removal usage data, recycling removal usage data, telephone usage data and broadband usage data.

Yet another embodiment of the present invention provides a report of resource performance for a first business premises. The report includes a first diagram element, a second diagram element and a third diagram element. The first diagram element is representative of a first resource usage at the first business premises during times of day when the first business premises is open to patrons. The second diagram element is representative of a second resource usage at the first business premises during times of day when the first business premises is closed to patrons. The third diagram element is representative of a comparison of the first resource usage to the second resource usage.

The report may include a fourth diagram element, a fifth diagram element and a sixth diagram element. The fourth diagram element may be representative of a third resource usage by a plurality of second business premises during times of day when the second business premises are open to patrons. The fifth diagram element may be representative of a fourth resource usage by the plurality of second business premises during times of day when the second business premises are closed to patrons. The sixth diagram element may be representative of a comparison of the first resource usage to the third resource usage.

The report may include a seventh diagram element representative of a comparison of the second resource usage to the fourth resource usage.

An embodiment of the present invention provides at least one non-transitory computer readable medium. The medium is encoded with instructions which, when loaded on at least one computer, establish processes for tracking resource performance for business customers. The processes include a process configured to receive usage data describing usage of a resource associated with a customer of a utility that provides the resource to the customer. The usage data includes information about usage of the resource for a plurality of contiguous periods of time. Each period of time is less than about six hours. The usage data has been metered at a business premises of the customer. A process is configured to receive operational data describing operation of the business premises. The operational data includes information describing times of day when the business premises is open to patrons. A process is configured to determine resource performance data for the business premises using the received usage data and the received operational data. The resource performance data includes information about: (i) resource usage at the business premises during the times of day when open to patrons, and (ii) resource usage at the business premises during times of day when closed to patrons. A process is configured to generate a report to the customer of the resource performance data.

Another embodiment of the present invention provides at least one non-transitory computer readable medium. The medium is encoded with instructions which, when loaded on at least one computer, establish processes for reporting resource usage of a customer of a utility that provides the resource to the customer. The processes include a process configured to receive characteristic data describing a first business premises. The characteristic data includes at least one specialty classification of the first business premises. A process is configured to receive characteristic data describing a plurality of second business premises. The characteristic data includes at least one respective specialty classification of each business premises of the plurality of second business premises. A process is configured to receive usage data describing usage of the resource by at least some of the plurality of second business premises. The resource is provided by a utility. A process is configured to select, from the plurality of second business premises, a plurality of selected second business premises. Each selected second business premises has a first specialty classification equal to a first specialty classification of the first business premises. A process is configured such that, if a number of the plurality of selected second business premises is less than a predetermined value, the process augments the plurality of selected second business premises with additional selected business premises. The additional selected business premises are selected from the plurality of second business premises. Each additional selected business premises has a second specialty classification equal to a second specialty classification of the first business premises. The second specialty classification is different than the first specialty classification. A process is configured to generate a report that includes usage data describing usage of the resource by the first business premises and usage data describing usage of the resource by at least one business premises of the plurality of selected second business premises.

Yet another embodiment of the present invention provides a system for tracking resource performance for business customers. The system includes a processor, a communication port and a memory storing instructions executable by the processor to perform processes. The processes include receiving, by the processor, usage data describing usage of a resource associated with a customer of a utility that provides the resource to the customer. The usage data includes information about usage of the resource for a plurality of contiguous periods of time. Each period of time is less than about six hours. The usage data has been metered at a business premises of the customer. The processor receives operational data describing operation of the business premises. The operational data includes information describing times of day when the business premises is open to patrons. The processor determines resource performance data for the business premises using the received usage data and the received operational data. The resource performance data includes information about: (i) resource usage at the business premises during the times of day when open to patrons, and (ii) resource usage at the business premises during times of day when closed to patrons. The processor generates a report to the customer of the resource performance data. The processor sends the report, via the communication port, to the customer.

An embodiment of the present invention provides a system for reporting resource usage of a customer of a utility that provides the resource to the customer. The system includes a processor, a communication port and a memory storing instructions executable by the processor to perform processes. The processes include receiving, by a processor, characteristic data describing a first business premises. The characteristic data includes at least one specialty classification of the first business premises. A processor receives characteristic data describing a plurality of second business premises. The characteristic data includes at least one respective specialty classification of each business premises of the plurality of second business premises. A processor receives usage data describing usage of the resource by at least some of the plurality of second business premises. The resource is provided by a utility. A processor selects, from the plurality of second business premises, a plurality of selected second business premises. Each selected second business premises has a first specialty classification equal to a first specialty classification of the first business premises. If a number of the plurality of selected second business premises is less than a predetermined value, augmenting, a processor augments the plurality of selected second business premises with additional selected business premises. The additional selected business premises are selected from the plurality of second business premises. Each additional selected business premises has a second specialty classification equal to a second specialty classification of the first business premises. The second specialty classification is different than the first specialty classification. A processor generates a report that includes usage data describing usage of the resource by the first business premises and usage data describing usage of the resource by at least one business premises of the plurality of selected second business premises. The report is sent, via the communication port, to the first business premises.

BRIEF DESCRIPTION OF THE DRAWINGS

The invention will be more fully understood by referring to the following Detailed Description of Specific Embodiments in conjunction with the Drawings, of which:

FIG. 5F illustrates a user interface for a customer to input business information according to an embodiment.

FIG. 5G illustrates a user interface to adjust a parameter to determine similar business premises according to an embodiment.

FIG. 8 shows an application of the computerized method in accordance with an embodiment.

DETAILED DESCRIPTION OF SPECIFIC EMBODIMENTS

Figure 1:
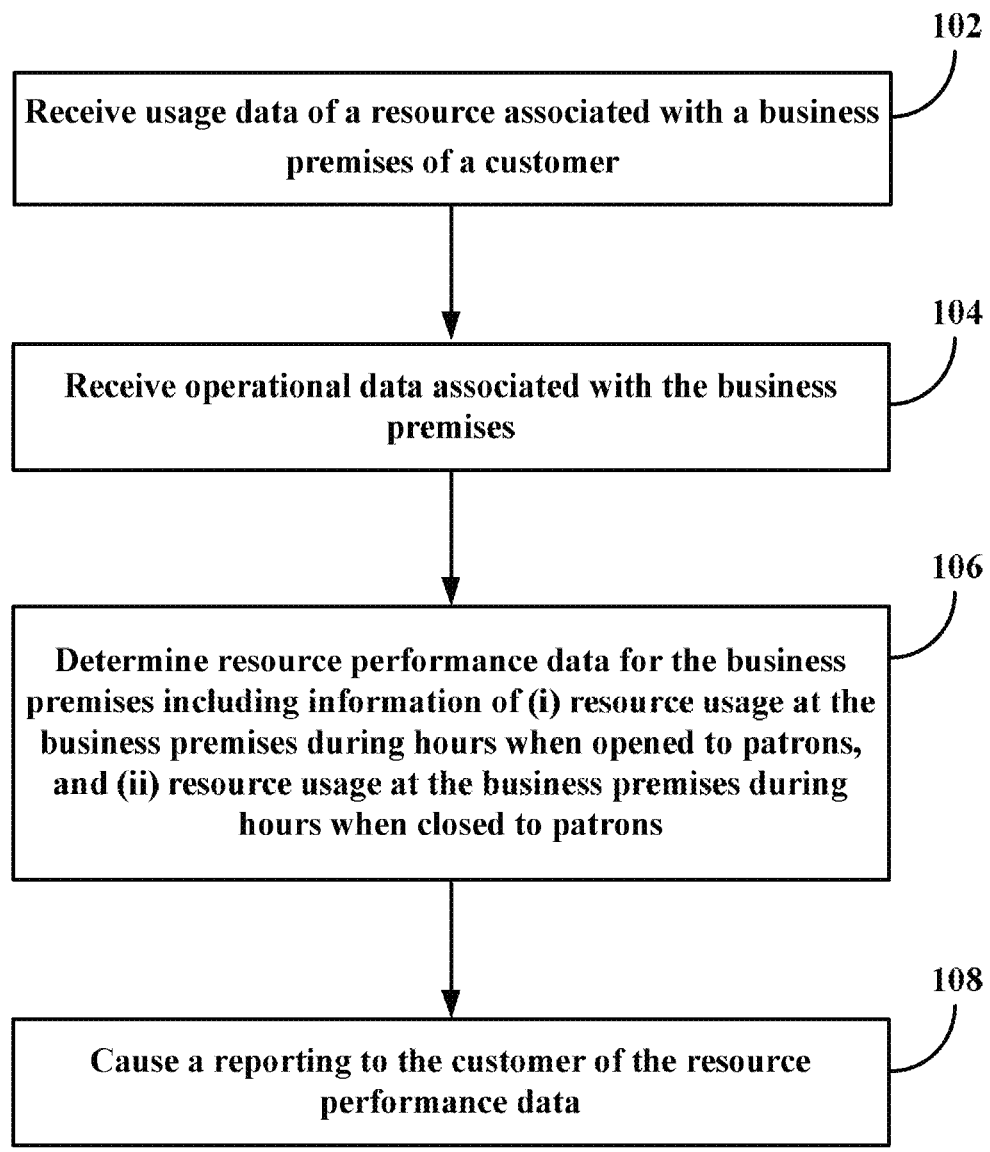
FIG. 1 schematically illustrates a flowchart diagram of a method of tracking resource performance for business customers according to an embodiment.

The term "small and medium size businesses" (herein interchangeably used with the term "small businesses") generally refers to a utility designation of a customer having a business account, in which the average resource draw (e.g., power draw) by the customer is within a predefined limit. Small and medium size businesses may include commercial (e.g., retail, services, construction, etc.), industrial (e.g., manufacturing), and government offices and functions (e.g., post office, administrative office, police station, etc.). For example, a utility may designate a business as small if it has a peak demand-use of 300 kilowatts or less each month. Of course, other limits exist, which are based on a designation provided by the utility.

A "local directory service provider" refers to third-party service that maintains records of characteristic information of a business, such as:

business type (retail, service, restaurant, movie theater, legal services, accounting services, dental office, etc.);
specialty or sub-type (e.g., for restaurant, a sub-type may include type of cuisine, availability of delivery services, on-premises only service, etc.);
general business information (e.g., hours of operations, address, number of employees, size of business premises); and premises information (e.g., type of heating, age of the premises, presence of air conditioning, premises size, presence of photovoltaic systems, etc.).

"Business premises" refers to a building or land where a business is being operated.

A "similar business premises" refers to a small and medium size business premises having a predefined number of common characteristics as the customer's business premises. The customer generally refers to a customer of the utility and is a person or entity for which the report is being prepared.

"Business premises" refers to a building or land where a business is being operated.

"Resource" refers to a commodity provided by a utility and may include electricity, water, and natural gas.

Generally, there are several barriers for existing and new small and medium sized businesses to be more energy efficient. For example, a business owner may have insufficient understanding of the benefits of energy performance tracking to their business operations. The business owner may lack the knowledge or resources (financial or time) to i) retain services to track the energy performance of their business or ii) deploy energy-performance tracking solutions for their business. Other financial or regulatory constraints may also exist. By providing energy information as it relates to business operations that require little or no participation from a business owner or manager, the barrier to be more energy efficient in operating a business is removed or substantially lessened.

Other benefits have also been contemplated. The utility typically sends the same type of billing statements to a business customer as to a residential customer, though it maintains records of a customer account being for a small business. The present embodiment may allow a utility to leverage information and data from its advanced meter infrastructure (AMI) systems and its database to provide new services or energy efficient programs for small and medium sized business customers. As such, a utility may realize value on their investment of AMI projects and Smart Grid initiatives by providing an all-in-one tailored solution to business customers.

Figure 2:
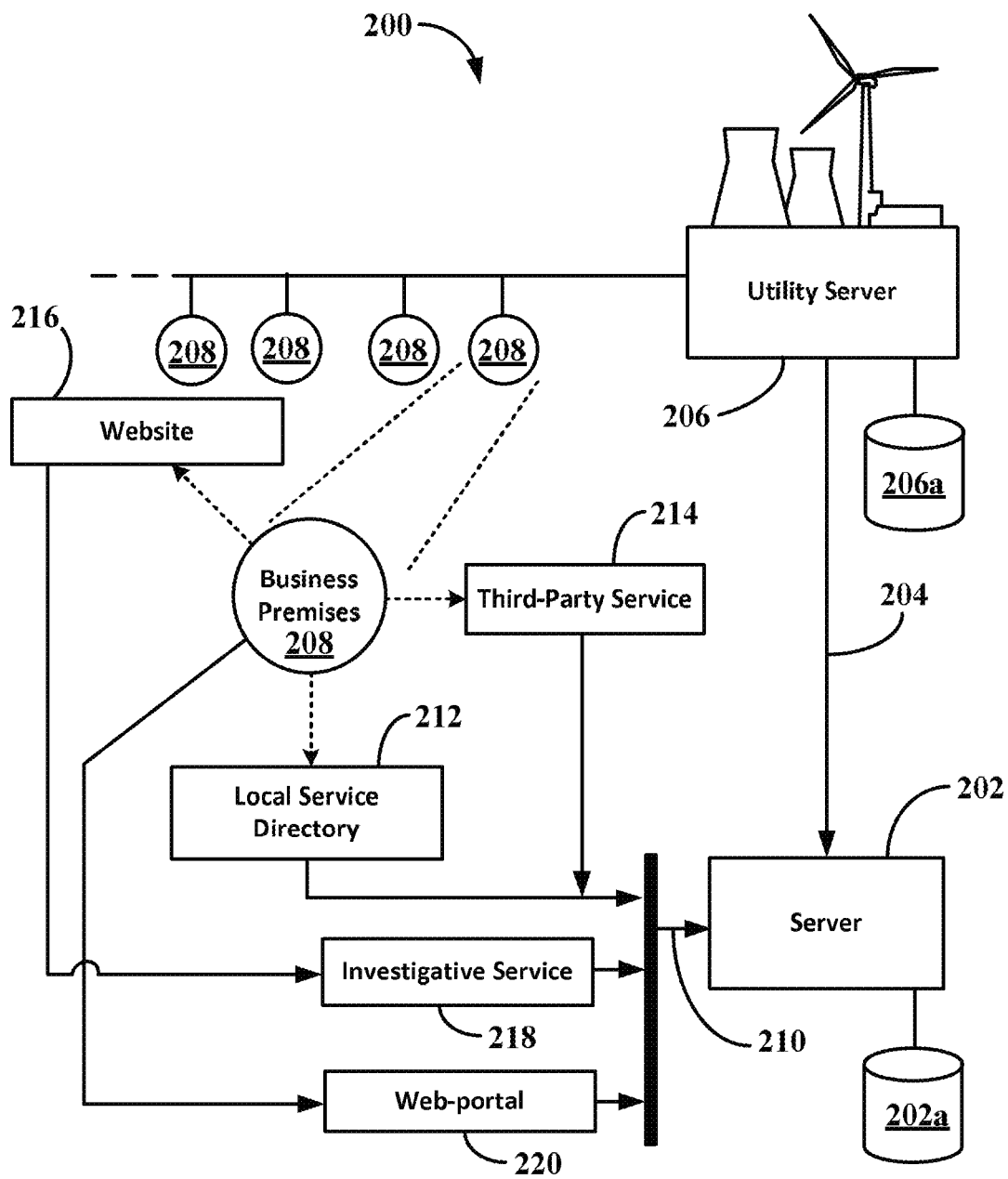
FIG. 2 illustratively shows a system that utilizes methods according to various embodiments.

FIG. 1 schematically illustrates a flowchart diagram of a method of tracking resource performance for business customers according to an embodiment. "Customer" generally refers to an entity or person that receives services from a utility, including delivery of the resource. FIG. 2 schematically illustrates a system that utilizes the methods according to various embodiments. FIGS. 1 and 2 are described in conjunction with each other.

A computer system 202 (labeled as "Server 202") may receive usage data 204 about a resource associated with a customer from a utility server 206 (step 102). A resource may be any types of commodity that the utility provides to the customer, including electricity, natural gas, water, etc. The usage data 204 may include hourly usage information of the resource metered at a customer's business premises 208 and stored at a data server 206a at the utility. Of course, the usage data 204 may be directly retrieved from meters at the business premises 208 by the computer system 202. The meter may be a communicating meter or an advanced meter infrastructure (AMI) meter. The server 206 may receive the usage data 204 via a communications network (e.g., internet) through, for example, e-mails, downloaded FTP files, XML feeds, or metering feeds. However, in other embodiments, the global communications network is not used. Instead, the resource usage data is sent by, for example, regular mail.

The computer system 202 may receive operational data 210 associated with the business premises 208. The operational data 210 may include information associated with hours of operations when the business premises is open and closed to patrons. Patrons generally refer to customers of a business operating at the premises.

The operational data 210 may be acquired from publicly available sources. A business typically publishes its hours of operations. For example, hours of operations information for a business premises may be electronically published and maintained by a local service directory 212, such as GOGGLE, YELP, or YAHOO!, among others. Several local service directories 212 may include application programming interfaces (API) within the electronic publication (ex., website), which may be used to retrieve the information within the electronic publication. For example, a web API may include interfaces for request-response systems, such as those expressed in JSON or XML, as well as standardized Javascript bindings within a web browser (ex., client-side web APIs, such as service-oriented architecture (SOA) with SOAP-based web services). "Local directory service provider" refers to third-party service providers that maintain records of characteristic information of a business, such as:

"Business type (e.g., retail, restaurants, movie theaters, legal services, accounting services, dental offices, etc.);

"Specialty or sub-type (e.g., for restaurant, a sub-type may include types of cuisine, availability of delivery services, on-premises only services, etc.);

"General business information (e.g., hours of operations, business address, number of employees, size of business premises, etc.); and "Premises Information (e.g., such as type of heating, age of the building, presence of aft conditioning, premises size, presence of photovoltaic systems, etc.).

Alternatively, the computer system 202 may receive the operational data 210 from a third-party service 214 such as DUN 7 BRADSTREET, INFOGROUP, or FACTUAL. A third-party service 214 is typically a company that maintains a database of information relating to a business, including business type and hours of operation Information. The operational data 210 may be procured by being purchased from the third-party service 214.

The operational data 210 may alternatively be retrieved directly from a publication by the business. For example, a business may publish the hours of operations of its business premises on the business website 216. An investigative service 218 may automatically or manually retrieve the hours of operations information directly from the business publication on its website 216.

The operational data 210 may alternatively be retrieved from a web portal 220 operatively linked to the computer system 202. A business may volunteer additional information to allow for a more rigorous analysis. For example, a business may provide characteristic information relating to its type, specialty, sub-market, size, number of employees, annual revenue, customer demographics, work hours and schedule, etc. The business may also provide information relating to its establishment, including the size of building, the age of the building, the types of heating, the type of cooling, etc. The information may be used, for example, to identify other similar business premises for comparative analysis of various resource usages.

In addition to operational data 210, consumer's business premises characteristic data may be received from third party sources, including the local service directory and the third-party service. Characteristic data may also be retrieved from various records, such as property tax assessment records, property sale records, aggregators of consumer data collected through surveys, warranty cards, customer loyalty programs, etc. In some embodiments, the consumer characteristic data can be received from the third party sources via the communications network (e.g., e-mails, downloaded FTP files, and XML feeds). However, in other embodiments, the consumer characteristic data may be received by regular mail.

The computer system 202 may determine usage performance of the resource by the business premises 208 based on the received usage data 204 and the received operational data 210. The usage performance may include information related to:

(i) resource usage by the business premises 208 during the hours when open to patrons;

(ii) resource usage at the business premises 208 during the hours when closed to patrons;

(iii) a ratio of the resource usage at the business premises 208 between the hours when open to patrons and the hours when closed to patrons.

Figure 3A:
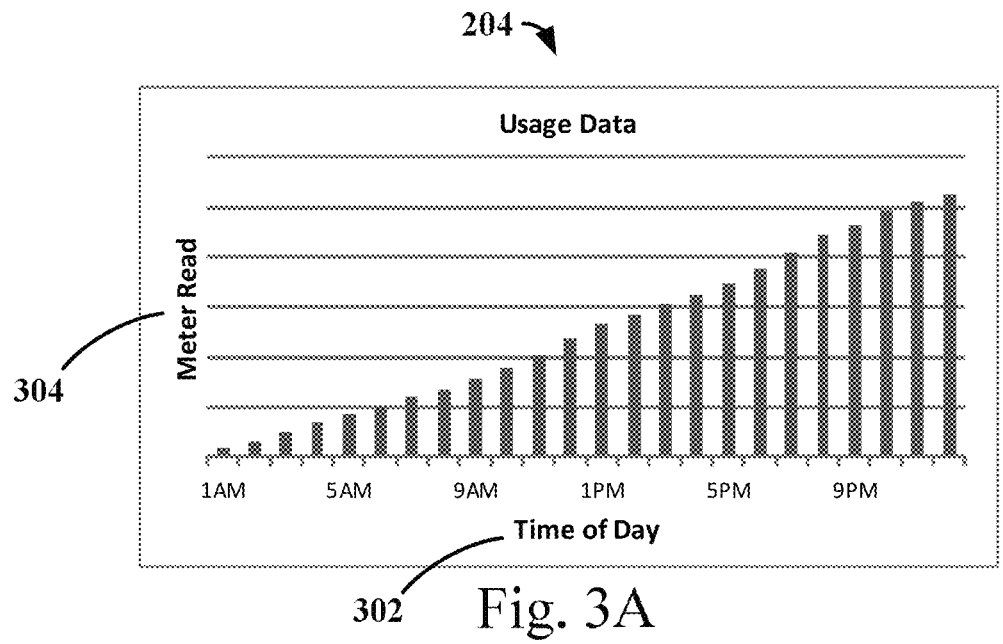
FIG. 3A is a plot of an example of usage data of a utility meter reading.

FIG. 3A is a plot of hypothetical usage data 204 of a utility electric meter reading. The x-axis 302 indicates the time of the day and the y-axis indicates the corresponding metering reading 304. The meter reading may be expressed in kilowatt-hours (kWh) for electricity resources. The usage data may be an average of usage during a reporting period shown over the course of a day. Other types of meter reading may be employed, which may have readings expressed in gallons for water resources, British Thermal Units (BTU) or Therms for natural gas resources, etc.

Figure 3B:
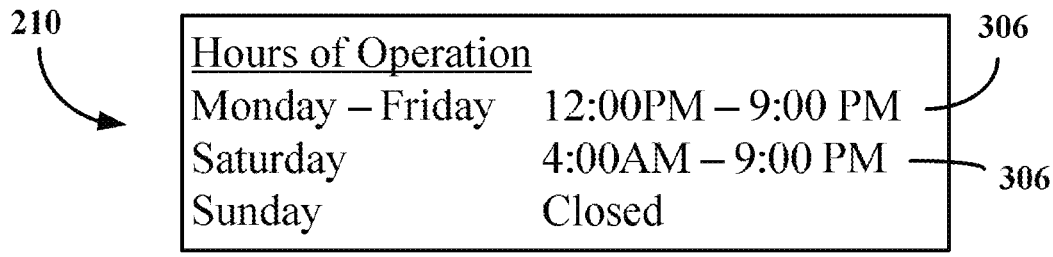
FIG. 3B is an example of operational data, including the hours of operations when the business premises is open to patrons.

FIG. 3B shows hypothetical operational data 210, including the hours of operations 306 when the business premises is open to patrons (12:00 PM, i.e., noon, to 9:00 PM Monday through Friday, and 4:00 AM to 9:00 PM Saturday). If only open hours are available from the operational data 210, the closed hours may be derived by assuming the business is closed all hours that it is not open.

Figure 3C:
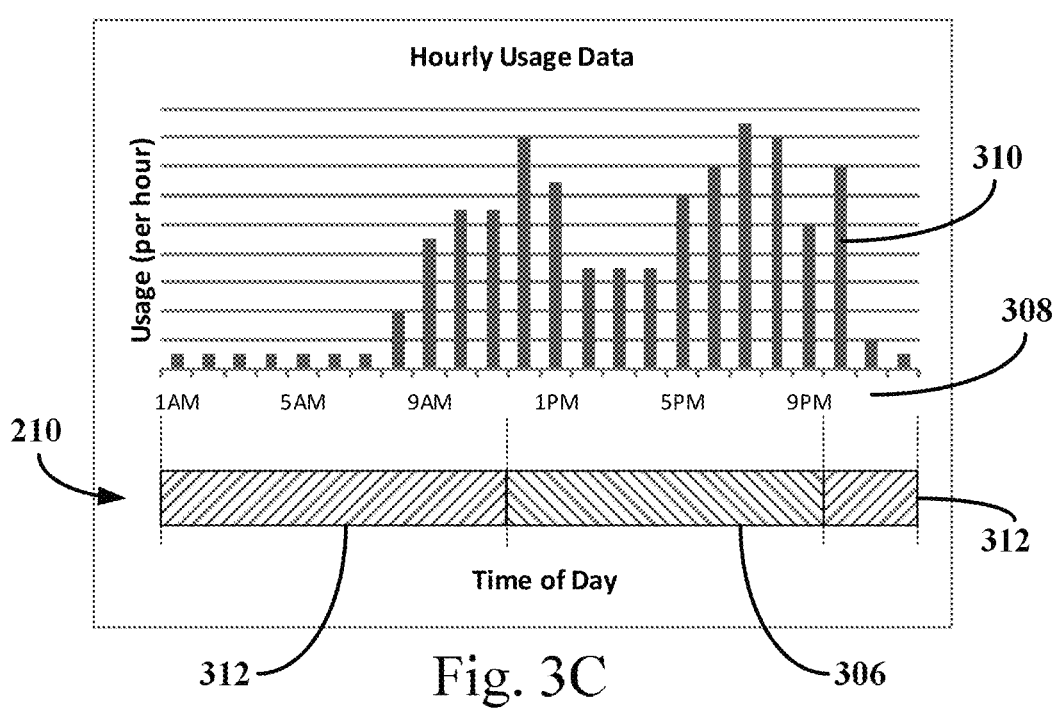
FIG. 3C is an example of the usage data of FIG. 3A correlated with the operational data of FIG. 3B.

FIG. 3C shows the usage data of FIG. 3A correlated with the operational data of FIG. 3B. The x-axis 308 indicates the time of the day, and the y-axis indicates the corresponding usage of the resource (referred to as hourly usage data 310). The operational data 210 is shown in relation to the corresponding usage data 310. FIG. 3C shows data of the open hours of operations 306 and the derived closed hours of operations 312.

Figure 4:
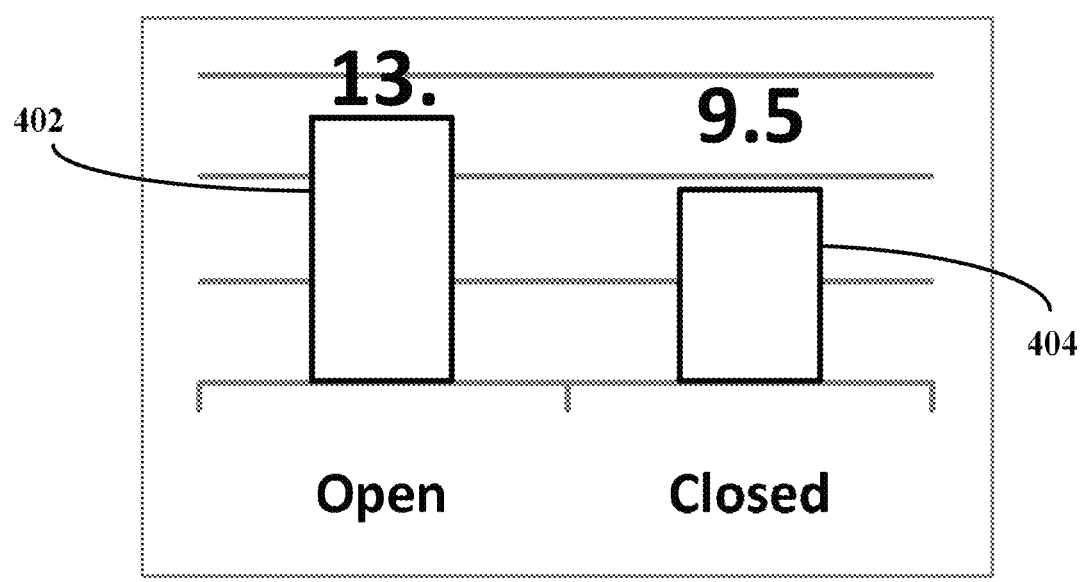
FIG. 4 is a comparative plot of the open hours usage data and closed hours usage data o FIG. 3C according to an embodiment.

FIG. 4 is a comparative plot of the open hours usage data 402 and closed hours usage data 404 of FIG. 3C according to an embodiment. Other performance metric may be derived from the open hours usage and the closed hour usage. For example, the computer system 202 may calculate a ratio of the closed hour usage data 404 to open hour usage data 402.

Referring back to FIGS. 1 and 2, the computer system 202 may cause a reporting to the customer of the determined resource performance data (step 108). The report may be formed in different ways. For example, the computer system 202 may generate, or direct another computer system to generate, an electronic message, which may be an electronic mail message. The report may be sent directly to the consumer via the electronic message. The report may also be sent to intermediaries, such as the utility companies or a service provider, and the intermediary may include the report in a utility bill, for example. The report may also be made available via web portal for the consumer. Of course, the report may be sent by paper mail using the described channels.

Optionally, the report may be part of a collection of reports sent to an Intermediary. The intermediary may utilize the collection of reports for further analysis. For example, the collection of reports may be segmented to identify a subset of business customers to target for promotions, efficiency programs, marketing analysis, and such. The collection of reports may be a structured data the (e.g., XML file), comma delimited text or spreadsheet, or binary data. The computer system 202 may employ APIs to communicate to a computer system of the intermediary. The APIs may be web-based, may be part of an enterprise API management or database system (e.g., ORACLE, SQL server, DB2, SYBASE, MYSQL, POSTGRESQL, TERADATA, INFORMIX, INGRES, SimpleDB, etc.), or may be a standalone application. Of course, other means of transmitting data between computer systems and networks may be employed.

The computer system 202 may receive resource performance data for similar business premises. The computer system 202 may cause a reporting to the customer of the similar business premises resource performance data in conjunction with the customer's resource performance data. A similar business premises refers to at least one premises having a predefined number of characteristics in common with the business premises for which the report is being prepared.

Report

Figure 5A:
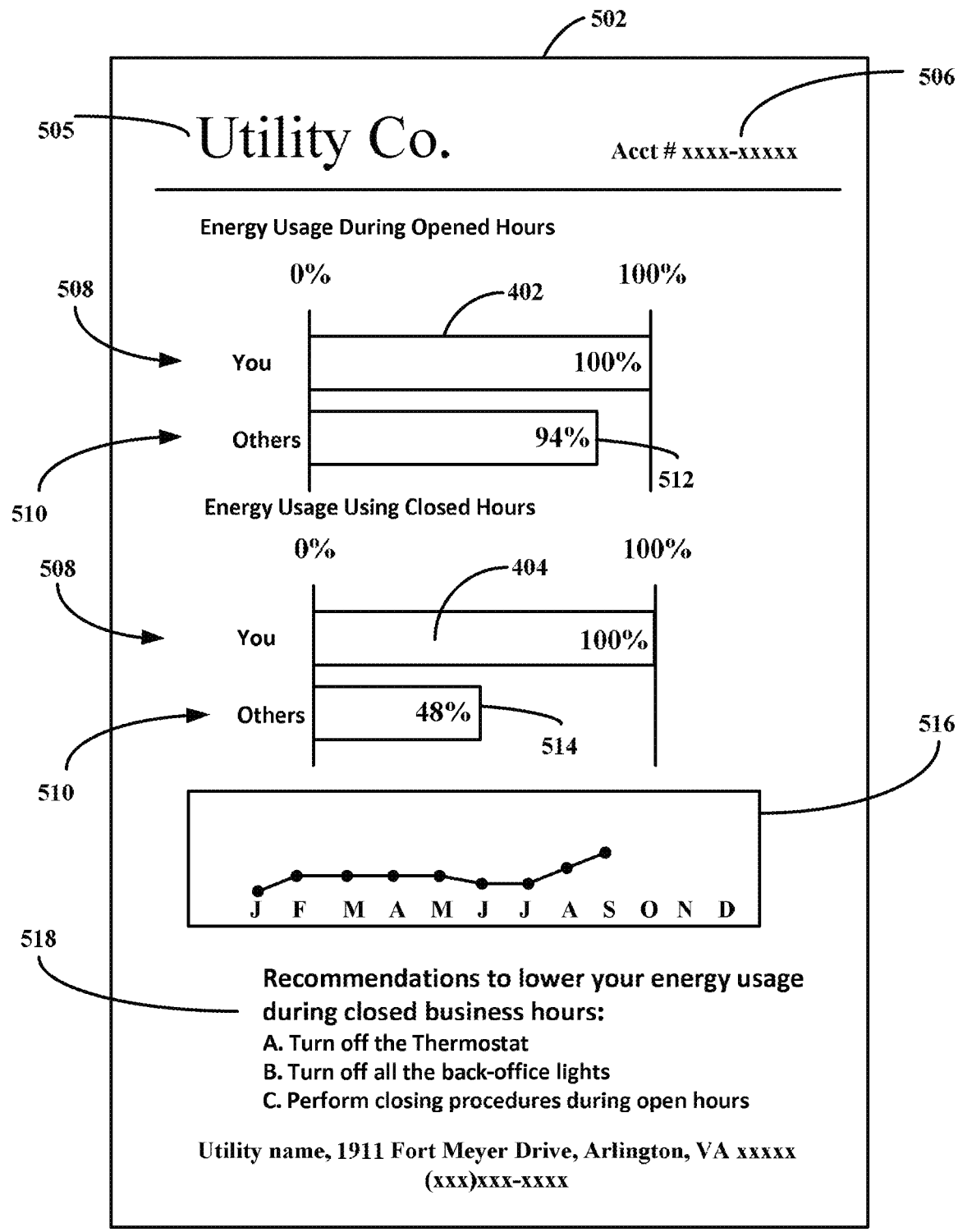
FIG. 5A illustrates an electronic mail report according to an illustrative embodiment.

FIG. 5A illustrates a hypothetical electronic mail report according to an illustrative embodiment. As shown, the report 502 may include an introductory statement 504 (not shown—see, for example, FIG. 5E), the utility name 505, an account number 506, resource performance information 508 including the open hour usage data 402 and closed hour usage data 404, comparative performance information 510 of similar businesses, including open hour usage 512 and closed hour usage 514, trend information 516, and text 518 suggesting one or more ways to help reduce usage. The resource performance information 508 is normalized to comparative performance information 510 in percentage, and expressed as a bar chart.

The resource usage information 508 and comparative information 510 may allow a customer to compare its performance to performance of similar business premises. For example, the open hour usage data 402 for the business premises is shown as 100%, while the open hour usage 512 for similar business premises is shown as 94%. In other words, similar business premises use less, i.e., 94% as much, energy than the subject business premises during open hours. The customer may readily observe that energy usage at his or her business premises is slightly higher and that there should be opportunities to reduce the usage. More significant here, the closed hour usage data 404 for the business premises is shown as 100%, while closed hour usage 514 for similar business premises is shown as 48%. This observation indicates to the customer that his or her operation of the business premises differs from the practice of his or her peers.

According to some embodiments, the computer system 202 may generate suggestions or recommendations to include in the report 502 based on the comparative information 510 during opened hours and/or closed hours. For example, if the comparative information 510 shows that similar business premises use less than a threshold amount of energy (e.g., 50%) during closed hours, the computer system 202 may generate a particular suggestion or set of suggestions. If the comparative information 510 shows that similar business premises use less than a threshold amount of energy (e.g., 80%) during opened hours, the computer system 202 may generate another suggestion or set of suggestions. The suggestions may further be customized based on the business type or other information associated with the business.

In FIG. 5A, the text 518 provides an explanation and/or a suggestion to reduce usage. Additionally, this observation provides the customer with objectively acquired data-driven information about the operations of the business premises that may elicit an action by the customer. The customer may investigate the operation of the business to, for example, determine that the thermostat of the business premises is not being properly set during closed hours, or that back office lighting or equipment are being left on. Additionally, it may suggest that there are opportunities to shift the time when employees perform certain business operation, such as to perform closing procedures during hours of the day when the business premises is open to patrons.

The resource usage information 508 and comparative information 510 may be an average of data acquired over a monthly period. Of course, other durations may be employed, such as an average over a billing cycle, a fiscal quarter, a fiscal year, etc.

Figure 5B:
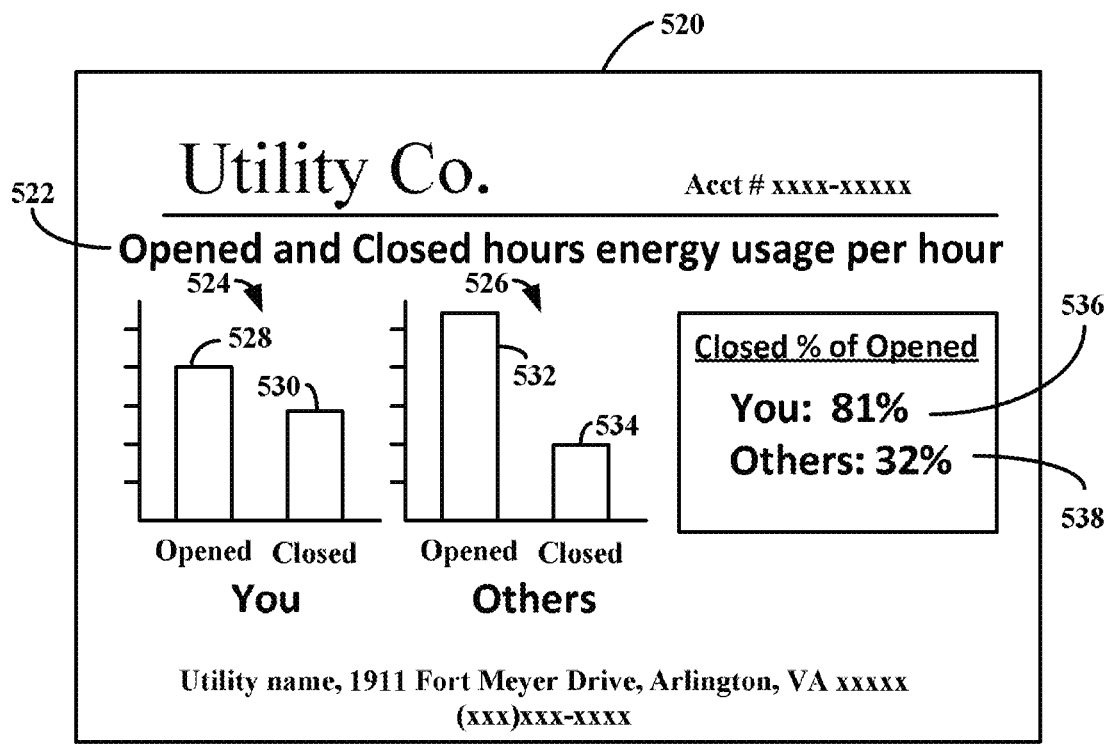
FIG. 5B illustrates an electronic mail report according to another embodiment.

FIG. 5B illustrates a hypothetical electronic mail report 520 according to another embodiment. The report 520 may include a comparative analysis 522 of data between the business premises 524 and similar business premises 526, expressed as a bar chart. The comparative analysis 522 may include:

- an average, range, maximum, minimum, and standard deviation of energy usage by the business premises when the premises is open to patrons (referred to as open hour energy usage 528);
- an average, range, maximum, minimum, and standard deviation of energy usage by the business premises when the premises is closed to patrons (referred to as closed hour energy usage 530);
- an average, range, maximum, minimum, and standard deviation of energy usage by a similar business premises when the premises is open to patrons (referred to as open hour energy usage of others 532);
- an average, range, maximum, minimum, and standard deviation of energy usage by similar business premises when the premises is closed to patrons (referred to as closed hour energy usage of others 534);
- a ratio of the closed hour energy usage 528 and the open hour energy usage 530 (referred to as closed percentage of open 536); and
- a ratio of the closed hour energy usage 532 and the open hour energy usage 534 (referred to as closed percentage of open 538).

Rather than being normalized as a percentage, data of the energy usage 528, 530, 532, 534 may be expressed in units of usage, for example, kWh or BTU. Alternatively, data of the energy usage 528, 530, 532, 534 may be expressed in terms of cost (dollars). As such, the energy usage may indicate the averaged expenditures during a given business open hours over a month period.

The energy usage data 528, 530, 532, 534 may indicate to the customer potential actions to reduce energy and cost. For example, data of the ratio of closed hour energy usage 528 may indicate to the customer that her business operations differ from operations of business premises of similar operational environment and patterns. In some instances, similar business premises 538 may include competitors (i.e., business entities engaged in commercial activity for similar or the same set of patrons). As provided in the figure, data of the ratio 536 for the business premises is shown as 81% while data of the ratio of energy usage between closed and open business hours for similar business premises is shown as 32%. This information readily communicates to the customer that his or her operation is very inefficient compared to similar businesses, and that he or she should be able to substantially reduce his or her energy usage.

Figure 5C:
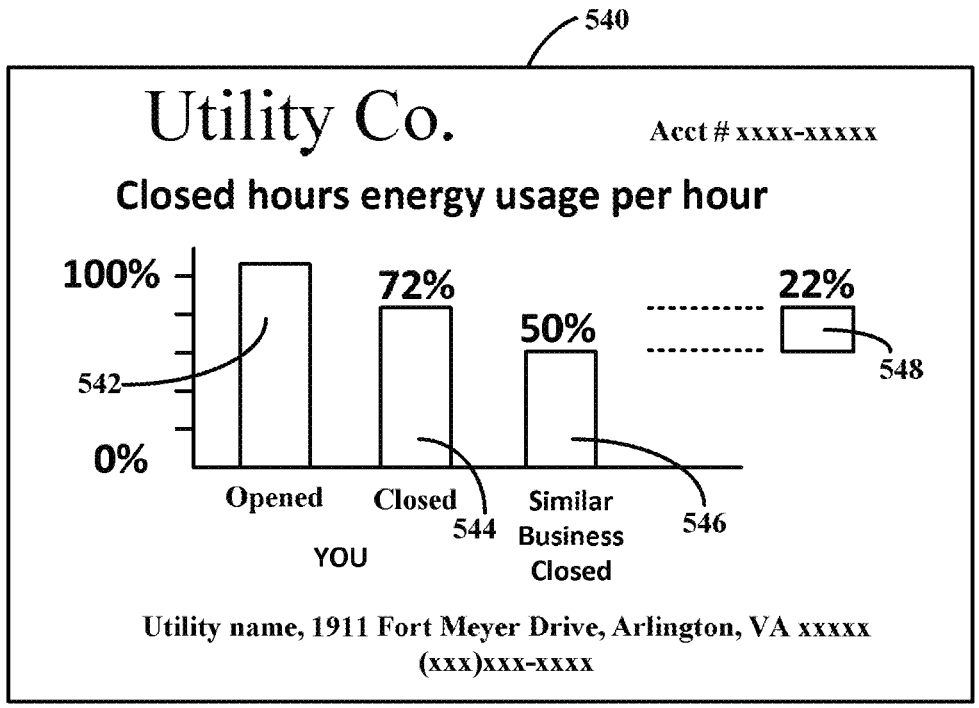
FIG. 5C illustrates an electronic mail report according to another embodiment.

FIG. 5C illustrates a hypothetical electronic mail report 540 according to another embodiment. The electronic mail report 540 allows for a direct comparison of data among energy usage during open hours 402, energy usage during closed hours 404, and energy usage during closed hours 514, expressed as a bar chart. The energy usage data may be normalized as a percentage of the energy usage during open hours 402. Additionally, the report 540 may include a graphical illustration 542 of a difference between data of the energy usage during closed hours of the business premises 404 and similar business premises 514.

The report 540 organizes the information to emphasize the closed hour operations. The energy usage data of the business premises during open hours 542 is normalized to 100%. The energy usage data during closed hours for the business premises 544 and for similar business premises 546 is shown in relation to the open hours. The report 540 may illustrate a difference 548 in energy usage between the business premises and similar business premises (including, for example, competitor) during closed hours. For example, data of the open hour energy usage 542 may read as 100%, while the closed hour energy usage 544 may read as 72%, and the closed hour energy usage 546 for similar business premises may read as 50%. Data of the difference in energy usage 548 during closed hours may read as 22%. As such, the owner of the business premises may observe the efficiency of his or her business operation during closed hours in relation to the open hours and may further observe that his or her efficiency is poor, in relation to other similar businesses (including, for example, competitors).

It is noted that, as the customer acts to reduce the energy usage of the business premises, the similar business premises may also be receiving similar customized reports and may be taking actions to reduce their energy usage. As such, the reports provide a feedback loop for business owners or managers to modify their business operation to match those within his or her respective industry. The difference in energy usage 548 is an observable feedback to customers to reduce their energy usages to conform to other similar businesses. The customer may readily determine his or her performance in relations to the similar businesses, including, for example, competitors. Over a large population of businesses, this feedback loop may normalize the energy usage of businesses to a level that is specific to a respective industry and market.

Figure 5D:
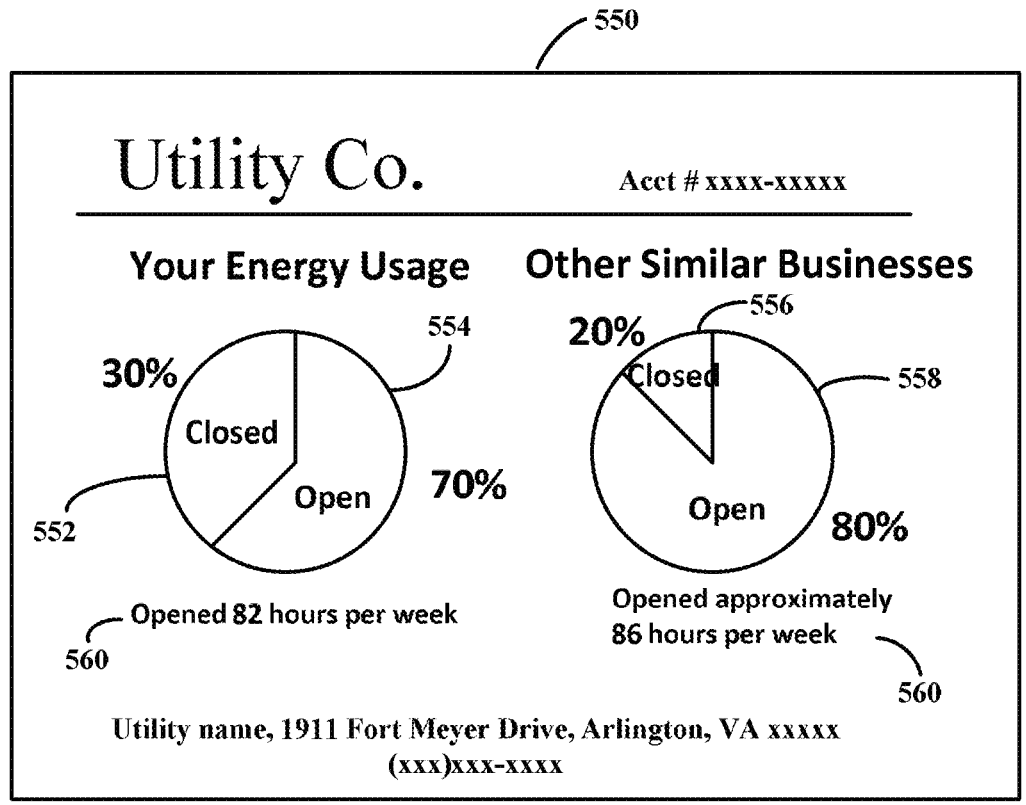
FIG. 5D illustrates an electronic mail report according to another embodiment.

FIG. 5D illustrates a hypothetical electronic mail report 550 according to another embodiment. The electronic mail report 550 allows for visual observations of data about energy usage between closed 552 and open hours 554, as a percentage of the total usage as compared to similar business premises (closed hours 556 and open hours 558), expressed as a pie chart. The report 550 may further provide indication 560 of the number of hours that a business is open to patrons, as compared to other similar businesses, including, for example, competitors.

Figure 5E:
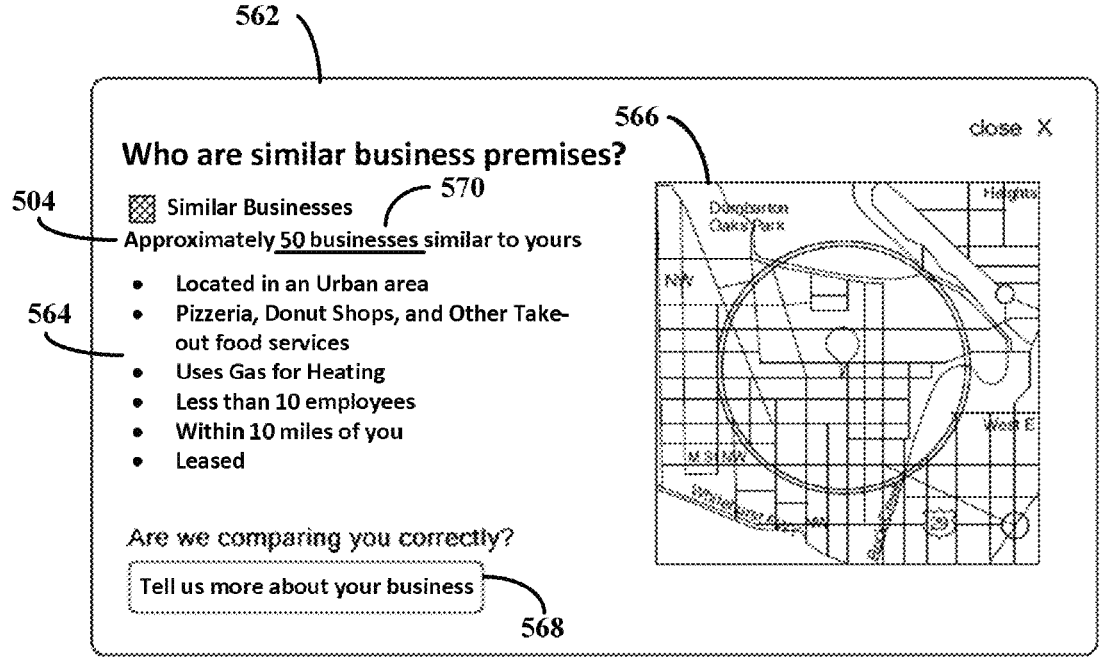
FIG. 5E illustrates an electronic mail report according to an embodiment.

FIG. 5E illustrates a hypothetical electronic mail report 562 according to an embodiment. The report 562 may provide a detail explanation 564 of factors used to determine a similar business premises. The explanation 564 may provide the criterion used in the similar business analysis. The explanation 564 may provide information related to the premises of the customer, which may be common with similar business premises used in the analysis. As such, the explanation 564 provides confidence to the customer that the analysis is relevant to his/her business operation. By showing the customer that the similar business premises in the report are in fact similarly situated, the report may motivate the customer to conserve energy. For example, assume the customer is a pizzeria. A set of common criteria is employed to determine similar business premises and may include: (1) whether the premises is located in an urban area, (2) whether it is pizzeria, a donut shop, or other take-out food service, (3) whether it has gas heating, (4) whether it has less than 10 employees, (5) whether it is located within 10 miles of the business, and (6) whether it is leased. The report 562 may include a map 566 to illustrate proximity of similar business premises employed in the analysis. The report 562 may include an input field 568 to allow the customer to provide information about the business. FIG. 5F illustrates a user interface for a customer to input business information according to an embodiment. By showing the customer that the similar business premises in the report are in fact similarly situated, the report may motivate the customer to volunteer further information about his/her business to provide for a more refined search.

In an embodiment, the factors employed to determine similar business premises may be the same among different reports to provide a consistent tracking metric over time. For example, the first report may be configured to provide at least a pre-specified number of business premises to ensure a sufficient population size for the comparison. However, in subsequent reports, the number of pre-specified number of business premises may be relaxed, within a pre-specified tolerance, and the factors are maintained. The population size of similar business premises may be, for example, at least 50. Of course, other numbers may be employed. The report 562 may provide an input 570 for the customer to modify the population size of similar businesses. The report may provide a range, including a minimum and maximum, to ensure that analysis has a sufficient population size.

In another embodiment, the explanation 564 may provide information available to the computer system 202 that may be considered in the analysis, though not used. As such, the explanation 564 provides opportunities for the customers to augment, confirm, correct, or remove information relating to his/her business operations.

FIG. 5G illustrates a user interface 570 to adjust a parameter to determine similar business premises according to an embodiment. The user interface 570 may be used by a user to select a number of similar businesses to be compared to the user's business or to select the number of closest matching businesses to be used in the comparison. The minimum number of businesses 572 may be limited to 25 to ensure a sufficiently large population size. The maximum number of businesses 574 may be specified by the number of available businesses that meet the criterion when not restricted by proximity. For example, if there are 532 pizzerias, in an urban area, having gas heating, having less than 10 employees, and in leased premises, the input may allow up to 532 for the analysis. The maximum may be rounded to 500 to simplify the interface. Alternatively, the best ranked results according to common criteria may be provided as the result.

Figure 6A:
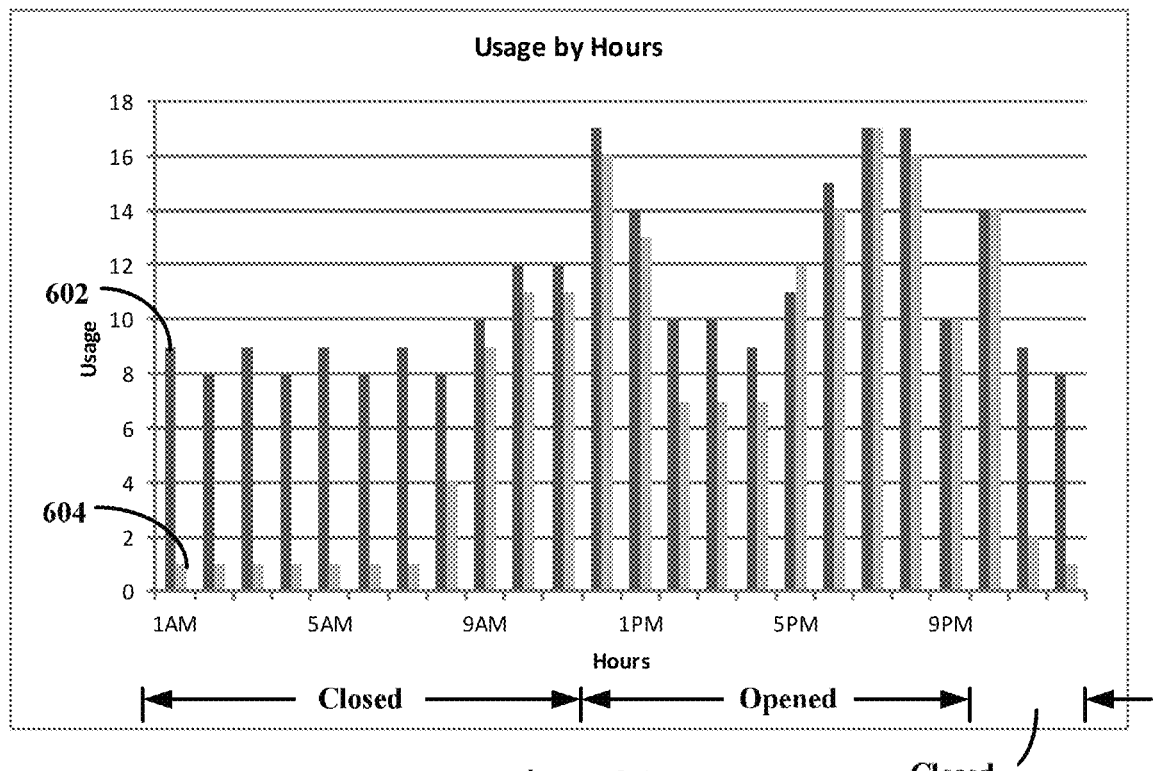
FIGS. 6A-6C are plots of energy usage data of a customer's business premises and similar business premises.
Figure 6B:
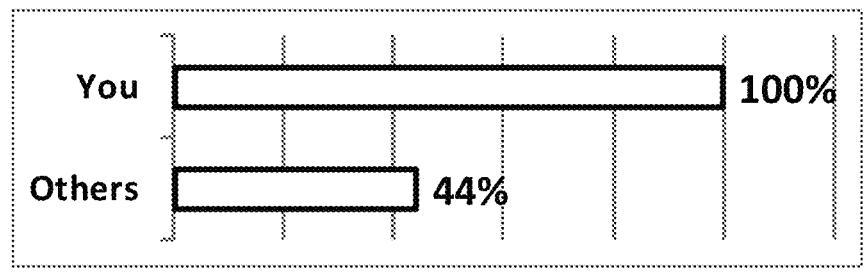
Figure 6C:
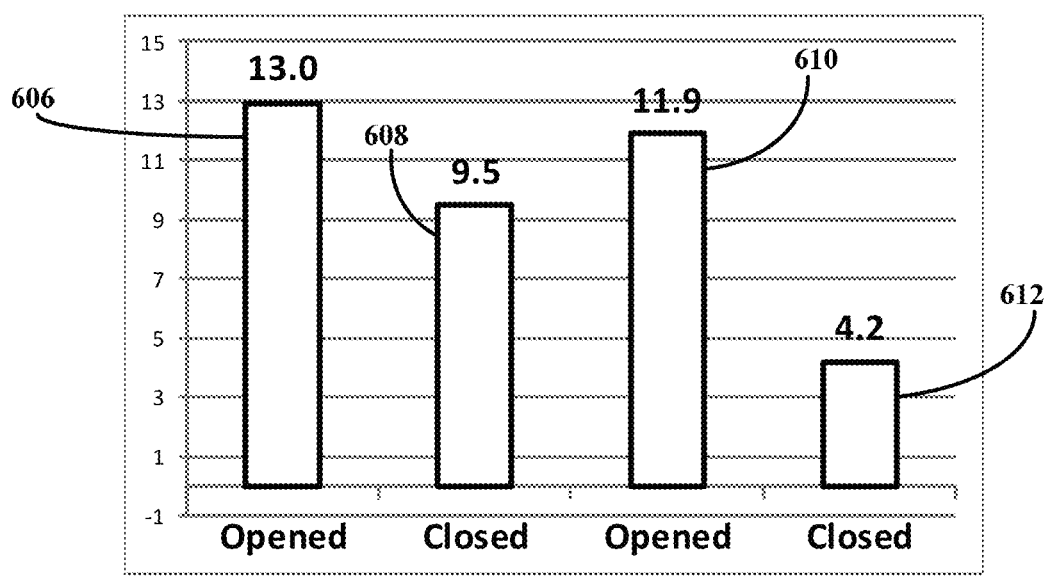

FIGS. 6A-6C are hypothetical plots of energy usage data of a customer's business premises and similar business premises. Specifically, FIG. 6A shows data about the energy usage of the customer 602 over a 24-hour period, as well as the energy usage of the similar business premises 604 over the same time period. FIG. 6B illustrates a comparison of the data of FIG. 6A, between the customer and similar business premises during closed hours. In this example, the business premises of the customer is open to patrons between noon and 9 pm and closed to patrons between 9 pm and noon. FIG. 6C illustrates an energy usage analysis of the data of FIG. 6A. The figure above each bar provides data about the energy usage of the customer during open hours 606 and closed hours 608, as well as the energy usage of similar business premises during open hours 610 and closed hours 612. Here, data about the energy usage of the customer during open hours 606 is 13 kWh, and the energy usage during closed hours 608 is 9.5 kWh. In contrast, data of the energy usage of similar business premises during open hours 610 is 11.9 kWh, and the energy usage during closed hours 612 is 4.2 kWh.

The text 518 (FIG. 5A) may be tiered to emphasize key takeaways for the customer that are based on a general list. For example, the general list may include ten actions that may help reduce energy usage. The text 518 may select key takeaways from the general list based, for example, on analysis of the usage data 310 and the operational data 312 of the customer business premises and similar business premises. The key takeaways may further motivate the customer to take energy reduction actions by providing a more tailored message and analysis. For example, in FIG. 3C, it is observed that the resource usage 310 begins to increase three hours prior to the business premises being open to patrons. This transition period may represent winding up time for the business premises, which may include enabling the climate control system, turning on the light, etc. The computer system may compare the customer's transition time to the transition times of similar business premises. Where the customer's transition time is longer (for example, where a similar business premises has a transition time of two hours while the customer's is three hours) and the total energy usage is higher (for example, the total energy usage is 10% higher during the transition period) than similar business premises, the report 502 may include a detail statement 518 to further help reduce energy usage during the transition time. The statement 518 may read, for example, "Your energy usage prior to the opening time appears to start one hour prior to other similar business premises. Have you considered delaying your programmable thermostat to start one hour later?"

Similarly, during closing hours, if the transition time between open hours and closed hours is longer than similar business premises, the customer's business may be using more resource during the winding down period. The report may include a statement 518 that may read, "Your energy usage during closing appears to be 2 hours longer than other similar business premises. Have you considered programming your thermostat to shut off one hour earlier?"

The statement 518 may quantify the amount of savings (reduced cost) or environmental impact and concatenate such information to the statement. For example, the statement 518 may read, "Your energy usage prior to opening time appears to start one hour prior to other similar business premises. Have you considered delaying your programmable thermostat by one hour? You may save up to $100 per year with the change."

Alternatively, rather than in monetary units, the statement 518 may quantify the amount of savings in environmental impacts. For example, the statement 518 may read, "Your energy usage prior to opening time appears to start one hour prior to other similar business premises, Have you considered delaying your programmable thermostat by one hour? The saving is equivalent to planting a new tree this year," The calculation converts energy savings, including kWh, into different types of equivalent units, including carbon sequestration from trees A calculator can be used to automatically perform these calculations A KW-hr may be equated to $7.0555 \times 10^{-4}$ metric tons of $CO_2$; a therm of natural gas may be equated to 0.005 metric tons of $CO_2$; and one urban tree plant provides a saving of 0.039 metric ton of $CO_2$. Thus, 55 KW-hr of electricity reduction is equated to one urban tree.

The various reports described herein may be employed individually or in combination in a statement to the customer. A report may be an electronic or hard copy statement that includes resource usage information and results of the analysis using methods disclosed in this application. It may include billing information as well.

Other analysis results may be added in conjunction with the report. For example, the various reports may be employed to report disaggregated energy usage information, including climate-control and non-climate control loads. A method of disaggregating climate and non-climate loads is disclosed in U.S. patent application Ser. No. 13/839,082 having the title "A Method to Identify Heating and Cooling System Power-Demand" and U.S. Patent Publication No. 2011/0106471, having the title "Method and System for Disaggregating Heating and Cooling Energy Use From Other Building Energy Use." These applications are incorporated herein by reference in their entirety.

Similar Business Premises

In another aspect of the embodiments of the invention, a method and system to determine similar business premises is provided. Determining similar business premises has been described in U.S. patent application (Publication No. US2012/0310708), filed May 4, 2012, by Richard Tyler Curtis and Kyle Yost, which is incorporated by reference herein in its entirety.

Figure 7:
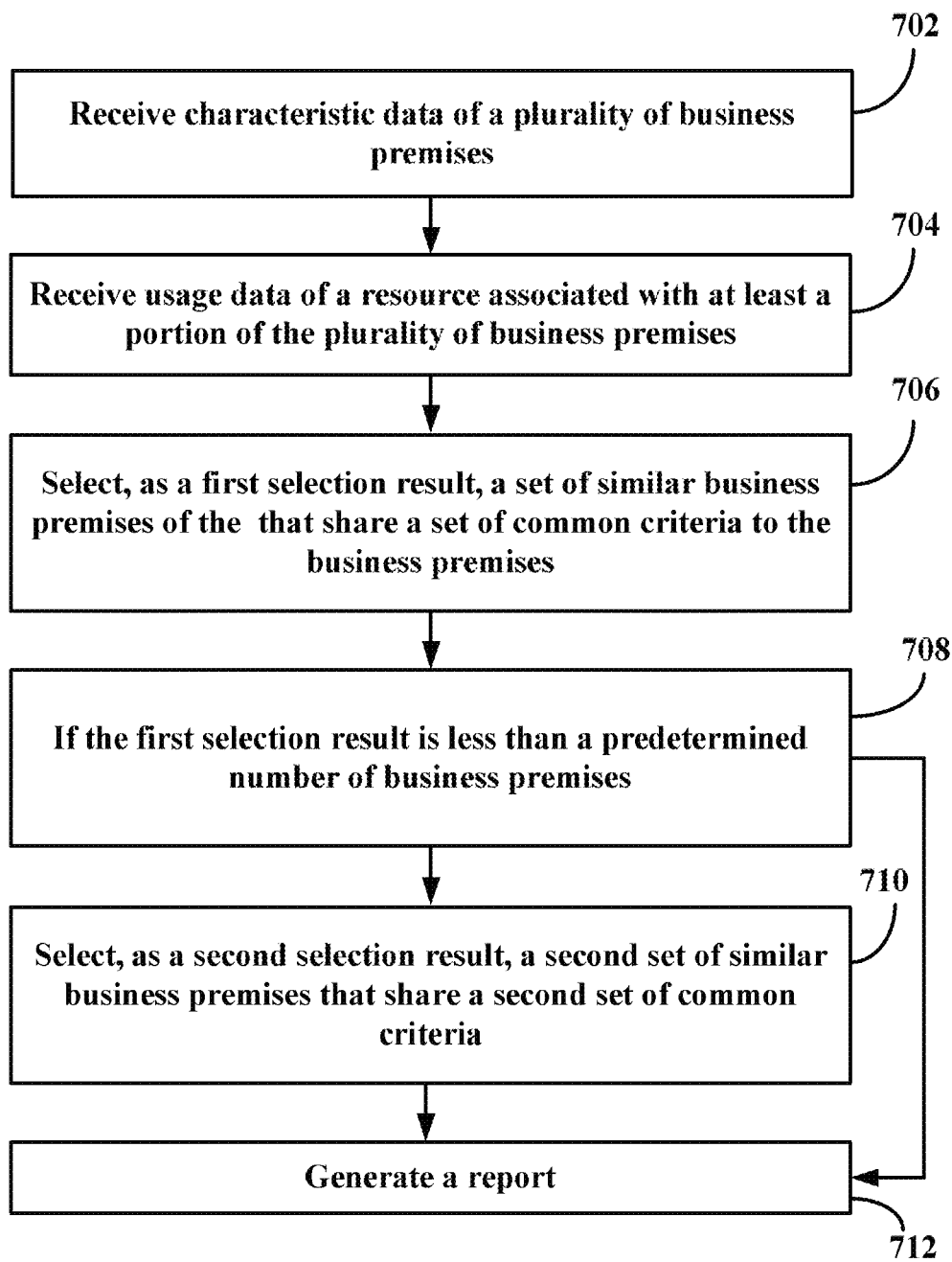
FIG. 7 shows a computerized method for reporting a consumer's usage of a resource by determining similar business premises in accordance with an embodiment.

FIG. 7 contains a flowchart illustrating a computerized method for reporting a consumer's usage of a resource by determining similar business premises, in accordance with an embodiment. The method starts by retrieving characteristic data of a business premises for a consumer and a set of business premises (step 702). The characteristic data includes a plurality of characteristics related to each business premises. For example, the characteristic data may include business type and classification, business-related characteristics, building data related to the physical characteristics of the premises (e.g., size of the physical property, heating system, and/or age of the property).

The characteristic data may include characteristic data related to the physical properties of each business premises, as selected from the following non-limiting list of examples:
 a common building and/or factory type;
 a common meter read cycle;
 a common heating fuel;
 a common building and/or factory size or floor space;
 a common type of equipment located on-site, including manufacturing equipment;
 a common building envelope and premises characteristics;
 a common number of building occupants, including number of employees, visitors or patrons;
 a common presence of a solar panel system (e.g., photovoltaic);
 a common presence of air conditioning;
 a common building and/or factory age;
 a common business type for one or more building and/or factory occupants; and
 a common building and/or factory location.

The characteristic data may also include characteristic data related to the occupants themselves, as selected from the following non-limiting list of examples:
 Number of employees within the business premises;
 Age of the employees; and
 Whether employees are seasonal employees, temporary employees, or independent contractors.

The characteristic data may also include characteristic data related to the business operation, as selected from the following non-limiting list of examples:
 Premises located in urban or suburban location;
 Type of business and services provided;
 Size of business (# of employees, # of customers, foot-traffic of business, revenue, etc.);
 Hours of operations; and
 Own or lease.

Business type and classification may include: type of service (e.g., agriculture, mining, construction, manufacturing, retail, transportation and warehousing, information, finance and insurance, real estate, professional services, management of companies, educational services, administrative, waste services, health care and social assistance, arts, entertainment, recreation, accommodations, food services, and public administration), type of customers (e.g., luxurious, standard, bargain), location for service (e.g., on-site, off-site). Type of services may include classification systems defined for the census, such as the North American Industry Classification System (NAICS), which is provided in Appendix A and is incorporated by reference herein in its entirety and the Standard Industrial Classification (SIC) as published by the Occupational Safety and Health Administration (OSHA), which is also incorporated by reference herein in its entirety. Type of services also includes industry generated classification. For example, companies such as YELP and ZAGAT maintains categories of services, such as food, nightlife, shopping, bars, beauty & spa, health & medical, automotive, local services, etc. Such classification may Include categories and sub-categories of business type.

The business type information may be acquired from publicly available sources. For example, business type, specialty, sub-specialty may be electronically published and maintained by a local service directory 212, such as GOOGLE, YELP, YAHOO!, among numerous others. Local service directory 212 may include an application programming interface (API) within the electronic publication (e.g., website), which may be used to retrieve the Information within the electronic publication. For example, a web API may include Interfaces for request-response systems, such as those expressed in JSON or XML, as well as standardized JavaScript bindings within a web browser (i.e., client-size web APIs, such as service-oriented architecture (SOA) with SOAP-based web services).

"Local directory service provider" refers to a third-party service that maintains records of characteristic information of a business, such as:
 Business type (e.g., retail, service, restaurant, movie theater, legal services, accounting services, dental office, etc.),
 Specialty or sub-type (e.g., for restaurant, a sub-type may include type of cuisine, availability of delivery services, on-premises only service, etc.), General business information (e.g., hours of operations, address, number of employees, size of business premises)

Premises information (e.g., such as type of heating, age of the building, presence of air conditioning, premises size, presence of photovoltaic systems, etc.).

The customer may be any party associated with a building (e.g., business owners, leasers, or business manager).

Certain characteristic data relating to the physical properties of the premises may also be acquired from publicly available sources, including maps, street view images, and satellite imaging. For example, common or differing building envelope and premises characteristics may include:

Numbers and locations of entrances and windows (e.g., presence of windows facing the sun, which may include south-facing windows for premises located in the northern hemisphere);

Presence of solar panels or wind-based generators;

Presence of a structures on the roof (e.g., chimney, central climate control systems);

Presence and numbers of window air conditioning units;

Presence of an outdoor pool;

Roof type (e.g., flat or angled);

Building color, floor size, and height;

Building orientation and location (e.g., latitude and longitude); and

Presence and degree of shading from neighboring structures, obstructions (e.g., mountains, signage/billboards), and/or tree and foliage.

Particularly, in suburban and rural locations where a single business premises resides in a single building envelope, information derived from image analysis of the business envelope or premises may be attributed to the business premises. The imaging data may be received, for example, from third-party services, such as mapping, street view, navigation, or satellite imaging services.

The method also includes receiving resource usage data for the various customers (step 704). For example, in one embodiment, the resource usage data may include electrical usage data reported in kilowatt-hours. In additional or alternative embodiments, the resource usage data may include natural gas reported in British Thermal Units (BTU), heating oil reported in gallons, and/or wood pellets reported in pounds. Furthermore, in illustrative embodiments, the resource usage data may include data related to any one or more of electrical usage data, gas usage data, waste usage data, water usage data, sewer usage data, garbage usage data, and recycling usage data.

In exemplary embodiments, the computer system selects at least one business premises that is similar to the business premises of the customer from the set of business premises based upon at least five criteria that are common between the business premises characteristic data and the set of business premises characteristic data (step 706). A common criterion may be a match between a characteristic of the customer's characteristic data and a characteristic of other business premises characteristic data. For example, a common criterion exists when the customer's business and the other business premises are of the same type business (e.g., they both are pizzerias). In another example, a common criterion exists when the customer's business and the other business premises are food-services. In yet another example, a common criterion exists when the customer's business and the other business premises both use the same heating fuel. For example, both business premises use electricity to heat the premises. Thus, a business premise that uses gas for heating would not be not selected as a similar business premises to the customer's business premises. In yet another example, a common criterion exists when the customer's business and the other business premises both have the similar geographic location (e.g., both businesses are located in the same area type (i.e., urban or suburban), zip code, city, or state).

In an alternative or an additional embodiment, the common criterion is a match between a range and another business premises' characteristic data. For example, in one embodiment, the common criterion is a match between a size of the other business premises and a range that is determined based upon a size for the customer's business premises. In one illustrative embodiment, the range is plus/minus 8% of the size (in square feet) of the customer's business premises. If the size of other business premises (in square feet) falls within that range, then the size of the premises is a common criterion between the customer's business premises and the other business premises. In another example, a common criterion is a match between a distance between the other business premises and the customer's business premises and a distance range. For example, the distance range might include all business premises within a 20 mile radius of the customer's business premises. If the other business premises falls within the 20 mile radius, then it matches the premises location criterion with the customer's business premises. A business premises that falls outside the 20 mile radius is not selected as similar business premises. In another example, a customer business premises with less than 10 employees may be matched if the other business premises has a range of occupants, such as 1-9 employees.

In the embodiment shown in FIG. 7, similar customers' business premises are selected on the basis of five common criteria. In other embodiments, however, similar business premises can be selected on the basis of other numbers of common criteria, such as 3, 5, 10, or 25 common criteria. In one particular embodiment, similar business premises are selected based upon: (1) a common urban/suburban location, (2) a common type of business, (3) a common size of business, (4) a common set of hours of operations, and (5) a common property ownership status, ex. owning or leasing the premises.

If the number of similar business premises selected is less than a predetermined number of business premises (step 708), then actions are taken to augment the set of similar businesses. In one illustrative embodiment, the predetermined number is 50 and thus the goal is to select 50 similar business premises that are most similar to the customer's business premises. If the number of initially selected business premises is less than 50, then the criteria are altered by using another criterion in another selection process to find more or additional similar businesses. For example, to augment the five common criteria, one of the common criteria may be expanded so that there are five common criteria for selecting similar consumers, but one of the criteria may include two categories. The categories may be based on a pre-defined classification system, such as NAICS code, SIC code, or other classification codes defined by a local service provider. In this way, a greater number of business premises will meet the common criteria.

In an embodiment, a full-service pizzeria may have a NAICS code no. 722511. The code 722511 includes other types of full-service restaurants, such as a bagel shops, diners, doughnut shops, family restaurant, fine dining restaurants, pizza parlors, and steak houses. A first search may include a common criterion of a pizzeria. A second search may be based on broader selection criteria, such as by including a common criterion of at least one other restaurant types in the same NAICS code, such as a bagel shops, diners, doughnut shops, family restaurant, fine dining restaurants, pizza parlors, and steak hours.

Figure 9:
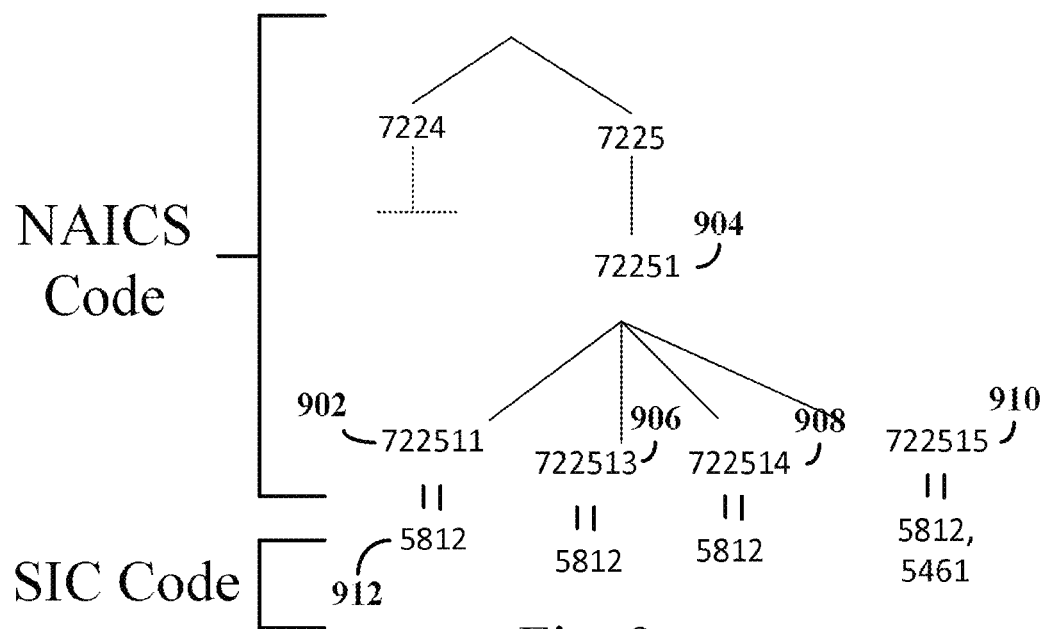
FIG. 9 illustrates a portion of the North American Industry Classification System (NAICS).

In another embodiment, the second search may entail moving up the classification code tree. FIG. 9 illustrates a portion of the North American Industry Classification System (NAICS). For example, NAICS code 722511 (902) is a sub-category of NAICS code 72251 (904), which includes NAICS code 722511 (i.e., full-service restaurants) (902), 722513 (i.e., limited-service restaurants) (906), 722514 (i.e., cafeterias, grill buffets, and buffets) (908), and 722515 (snack and nonalcoholic beverage bars) (910). The second search may include businesses having NAICS code 72251 (904), which includes 722511 (902), 722513 (906), 722514 (908), and 722515 (910).

The second search may entail searching equivalent classification codes in other classification systems. For example, a pizzeria may have a NAICS code no. 722511 (902). The NAICS code no. 722511 (902) has a crosswalk with SIC code no. 5812 (912) relating to "eating places." The second search may include SIC code no. 5812 (912) as one of the common criterion. Appendix B provides a table of crosswalks between NAICS code and SIC code. The appendix is incorporated herein by reference in its entirety.

In additional or alternative embodiments, if the number of similar business premises selected is less than a predetermined number, then actions are taken to abate (relax) the common criteria. Abatement may include removing at least one common criterion from the selection process. For example, to abate five common criteria, one of the common criteria is removed so that there are only four common criteria for selecting similar business premises. In this way, a greater number of similar business premises will meet the common criteria.

In additional or alternative embodiments, the criteria are abated by increasing at least one range for at least one of the common criteria. For example, in one illustrative embodiment, the range of 20 miles of the proximity of the business premises is increased to 50 miles business premises so that a greater number of other business premises fall into the range. Once the criteria are abated, the selection process is run again. The selection and abating process may be performed iteratively until the number of similar business premises is equal to or greater than the predetermined number of business premises (e.g., 50 similar business premises). For example, if four common criteria still do not generate 50 similar consumers, then the common criteria are further abated by, for example, removing another common criterion and/or by increasing a range for a least one of the common criteria. Once the selection process selects a number of similar business premises that is equal to or greater than the predetermined number of similar business premises, then an electronic report is caused to be generated (step 712) using the list of similar business premises.

The selection process 706 can be implemented in various ways. For example, in one embodiment, when the distance range is increased from a from 20 mile to 50 miles, the selection process 706 searches for similar consumers within a radius of 50 miles from the customer's business premises. In another embodiment, the selection process 706 avoids re-analyzing the geographic area within 20 mile of the customer's business premises and instead searches for similar business premises within the geographic area between 20 mile and 50 miles from the customer's business premises. In this manner, the selection process 706 saves computing time and effort because the geographic area within 20 mile of the customer's business premises had already been analyzed in the previous iteration.

FIG. 8 shows an application of the computerized method in accordance with an embodiment. The computerized method starts with five common criteria (802): (1) a rural location of the premises (selected between urban/suburban location); (2) a pizzeria business (selected as a type of business); (3) a business with less than 10 employees (selected as a size of business), (4) distance within 20 miles, and (5) the business premises being leased (selected between leased or owned). The predetermined number of similar business premises in this embodiment is 50. When the selection process is run using these five common criteria (804), 25 similar business premises are found (806). Because 25 similar business premises is less than the predetermined 50 similar business premises, the five common criteria may be abated or augmented. For the second iteration, the distance criterion is increased by 30 miles from 20 miles to 50 miles (808). When the selection process is run again, an additional 3 similar business premises are selected (810). Thus, the total number of similar business premises found after two iterations is 28. Since 28 similar business premises is less than the predetermined 50 similar business premises, the common criteria are again abated or augmented. For the third iteration, the type of business is augmented with a second category. Specifically, the "pizzeria" category is augment to include a "donut shop" (812). When the selection process is run, it selects 10 more similar consumers (814). Since 35 similar business premises is less than the predetermined 50 similar business premises, the common criteria are again abated or augmented. For the fourth iteration, the type of business is augmented with a third category, specifically, a "take-out food service" (816). When the selection process is run, it selects 19 more similar consumers (820). Accordingly, the total number of similar business premises at this point is 54 and the iterative process stops because the number of selected similar business premises is at least the predetermined number 50.

In an illustrative hypothetical, if there were four more business premises found in the fourth iteration, then 54 similar business premises would be used in the report. In another embodiment, however, the additional four business premises maybe ranked according to, for example, distance or square footage, and the best 15 business premises may be selected from the 19 matches as similar business premises for a total of 50 similar business premises.

In another embodiment, the computerized method may additionally be configured to be "adaptive" to the number of similar consumers selected in the iterative process. As explained above with respect to FIG. 7, if a number of similar consumers selected is less than a predetermined number, then the common criteria are augmented to a degree. In the computerized method of FIG. 5, the degree to which those common criteria are augmented may depend on the number of similar consumers selected 706.

For example, the adaptive process may be applied to common criteria, such as distances between premises, ranges associated with the size of the home, the meter read cycle, and number of businesses in a premises can also be increased based upon both the number of similar business premises selected in the last iteration and/or the number of similar premises selected in all of the iterations. In further illustrative embodiments, the "adaptive" process is applied so that the number of common criterion abated (e.g., removed) from the iterative process depends on the number of similar business premises selected.

Certain common criteria may be more meaningful to analysis of resource usage than other common criteria. The inventors discovered that urban and suburban location is a meaningful criterion. Business premises in an urban location tend to be located within a certain type of business structure as compared to a suburban location. In urban location in particular, multiple businesses may reside in a single building structure. The type of business is also a very important criterion. The type of business category provides a common condition and pattern that the business is subjected to during the course of business operations at various hours of operations, including when the patrons are present and not present on the premises. The hours of operations (e.g., time-dependent market factors) also affect operations of a business. For example, if a restaurant business provides breakfast service, the time when employees and staff would have to be on-site tends to be similar, as compared to a restaurant that provides only dinner services. Another important criterion is whether the business premises is owned or leased. A business that owns its premises tends to invest more in the structure, whereas a lessee may merely adjust available settings. Another criterion is the physical envelope of the business premises. A business premises that have south-facing windows, for example, may receive more sunlight for lighting, and heating during the winter. Such business premises may employ less resource for lighting and heating. On the other hand, south-facing windows may increase air conditioner load.

In another embodiment, the augmenting of common criteria for the search 706 may be based on a similarity index. The similarity index may have a form as shown in Equation 1.

$$S = a\_1 * Factor\_1 + a\_2 * factor\_2 + a\_n * factor\_n \quad \text{(Equation 1)}$$

The coefficients a_1, a_2 and a_n, may denote weight values that range from 0 to 1, where n is the number of factors employed to generate the index. The factors may include a common description, common NAICS code, common SIC code, and common local service directory description.

Figure 10:
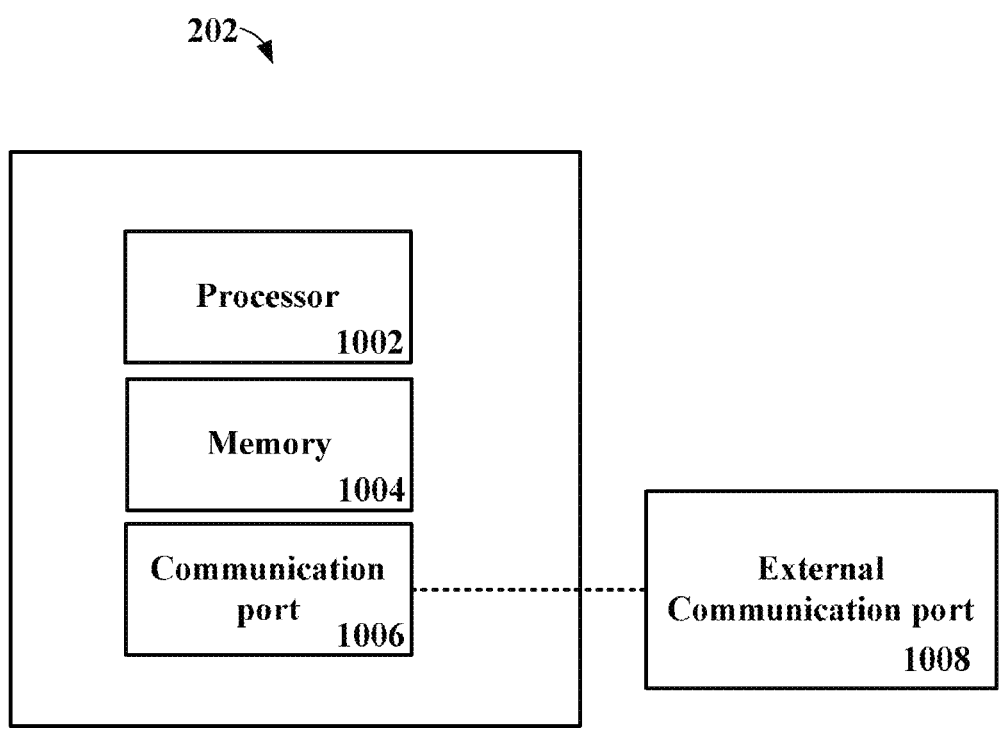
FIG. 10 illustrates a computer system according to an illustrative embodiment.

FIG. 10 schematically illustrates a computer system 202 according to an illustrative embodiment. The server 202 includes a processor 1002, a memory 1004, and a communication port 1006. The processor 1002 may be programmed with any one or more of the following software modules stored in memory 1004, including:

A utility communication module for receiving resource usage data.
A third party source communication module for receiving characteristic data of businesses premises.
A website module for supporting the website.
A storage module for storing characteristic data of business premises and resource usage data.
A retrieval module for retrieving customer resource usage data and customer's characteristic data.
A selection module for selecting similar business premises.
An analysis module for determining the open hour and closed hour performance of a business premises.
A disaggregation module for determining the climate and non-climate control load of a business premises.
A report module for generating a report that displays the resource usage data for the consumer and other similar consumers.
A customer communication module for communicating the report to the customer via, for example, the website or e-mail.
A printing module for the report to be sent to customer via regular mail.

The communication port 1006 may operative link to an external communication port 1008, which may be part of another computer system, a network routing/packet switching equipment, a programmable logic device, another electronic computing devices, etc. The link may be part of a local area network, a wide-area network, or a combination thereof, and may include any of various standard protocols, such as IEEE-802, as well as proprietary protocols.

The reports may be communicated to the customer in various ways. In one example, the reports are sent to the customer via electronic mail (email) to the customer's e-mail account. In another example, the customer receives the reports in hard copy form via regular mail. In yet another illustrative embodiment, the customer can log into his or her profile on a website and view the reports in a web page. In some embodiments, the reports are part of a resource usage bill. In other embodiments, the reports are provided to the customer separately from the bill.

It should be noted that terms such as "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

The various components of the control program may be implemented individually or in combination. For example, each component may be implemented or a dedicated server or a set of servers configured in a distributed manner.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines)

without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other programmable logic device (PLD)), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A computer-implemented method of tracking resource performance for business customers, the computer-implemented method comprising:

receiving, by a processor, transmissions of usage data over a communications network of an advanced meter infrastructure system, wherein the transmissions are received through metering feeds from advanced meter infrastructure meters;

retrieving, by the processor over a network from electronic publications using computing interfaces for communicating over the network, characteristic data describing a first business premises, wherein the characteristic data comprises at least (i) a first specialty classification that corresponds to a first North American Industry Classification System (NAICS) code and (ii) a second specialty classification that corresponds to a second NAICS code, wherein the first specialty classification is different than the second specialty classification and the first NAICS code is different than the second NAICS code;

generating, by the processor, a similarity index comprising a set of coefficients used to augment criteria used to determine similarity between business premises, wherein a coefficient comprises a weight value to apply to a characteristic of a corresponding criterion;

selecting, by the processor, a set of second business premises by applying the similarity index to characteristics of a plurality of second business premises and the first specialty classification corresponding to the first NAICS code of the first business premises, wherein weight values of coefficients for the criteria are applied to corresponding characteristics of a second business premises to determine similarity of the second business premises in relation to the first business premises, wherein the second business premises is selected for inclusion within the set of second business premises;

in response to determining that a number of business premises in the set of second business premises is less than a threshold, (i) adjusting a parameter on a user interface to change an amount of similar business premises and in response thereto selecting, by the processor, one or more additional business premises associated with the second specialty classification corresponding to the second NAICS code of the first business premises and (ii) augmenting, by the processor, the set of second business premises with the one or more additional business premises;

generating, by the processor, a report that comprises usage data describing usage of a resource by the first business premises and usage data describing usage of the resource by the set of second business premises; and sending, by at least the processor, the report to a remote device associated with the first business premises to cause the first business premises to perform energy reduction actions to reduce consumption of the resource by the first business premises.

2. The computer-implemented method of claim 1, wherein resource performance data is determined from the usage data, and wherein the resource performance data comprises a comparison of the resource usage at the first business premises between times of day when the first business premises is open to patrons and the times of day when the first business premises is closed to patrons.

3. The computer-implemented method of claim 2, wherein the generating the report further comprises:
generating the report to comprise the resource performance data.

4. The computer-implemented method of claim 1, further comprising:
receiving, by the processor over the communications network from an advanced meter infrastructure meter associated with the first business premises, the usage data describing usage of the resource by the first business premises.

5. The computer-implemented method of claim 4, further comprising:
retrieving operational data describing operation of the first business premises, and comprising information describing times of day when the business premises is open to patrons.

6. The computer-implemented method of claim 5, further comprising:
determining resource performance data for the first business premises for different times of day using the received usage data and the received operational data.

7. The computer-implemented method of claim 5, wherein retrieving the operational data further comprises determining the operational data as describing times of day of operations when the business premises is open to patrons based on the received usage data.

8. The computer-implemented method of claim 1, further comprising:
receiving resource performance data for similar business premises; and
including the resource performance data within the report.

9. The computer-implemented method of claim 5, further comprising:
receiving pricing data for the resource, comprising: information about a first price of the resource, a first set of times of day associated with the first resource price, a second price of the resource that is higher than the first price, and a second set of times of day associated with the second resource price;
determining an elevated pricing time based on the pricing data and the operational data, the elevated pricing time being a time of day when the first business premises is open to patrons overlaps with the times of day associated with the second resource price;
estimating savings that may be realized if a predefined portion of the usage of the resource during the elevated pricing time were moved to a time of day when the first business premises is closed to patrons; and
including the estimated savings within the report.

10. The computer-implemented method of claim 1, wherein the usage data comprises at least one of electricity usage data, gas usage data, oil usage data, wood usage data, waste removal usage data, water usage data, sewer usage data, garbage removal usage data, recycling removal usage data, telephone usage data and broadband usage data.

11. The computer-implemented method of claim 1, wherein the usage data comprises information about usage of the resource for a plurality of contiguous periods of time.

12. A computerized method for reporting resource usage by a customer of a utility that provides the resource to the customer, the method comprising:
receiving, by a processor, transmissions of usage data over a communications network of an advanced meter infrastructure system, wherein the transmissions are received through metering feeds from advanced meter infrastructure meters;
retrieving, by the processor over a network from electronic publications using computing interfaces for communicating over the network, characteristic data describing a first business premises, wherein the characteristic data comprises at least (i) a first specialty classification that corresponds to a first Standard Industrial Classification (SIC) code and (ii) a second specialty classification that corresponds to a second SIC code;
generating, by the processor, a similarity index comprising a set of coefficients used to augment criteria used to determine similarity between business premises, wherein a coefficient comprises a weight value to apply to a characteristic of a corresponding criterion;
selecting, by the processor, a set of second business premises by applying the similarity index to characteristics of a plurality of second business premises and the first specialty classification corresponding to the first SIC code of the first business premises, wherein weight values of coefficients for the criteria are applied to corresponding characteristics of a second business premises to determine similarity of the second business premises in relation to the first business premises, wherein the second business premises is selected for inclusion within the set of second business premises;
in response to determining that a number of business premises in the set of second business premises is less than a threshold, (i) adjusting a parameter on a user interface to change an amount of similar business premises and in response thereto selecting, by the processor, one or more additional business premises associated with the second specialty classification corresponding to the second SIC code of the first business premises and (ii) augmenting, by the processor, the set of second business premises with the one or more additional business premises;

generating, by the processor, a report that comprises usage data describing usage of the resource by the first business premises and usage data describing usage of the resource by the set of second business premises; and sending, by the processor, the report to the first business premises to cause the first business premises to perform energy reduction actions to reduce consumption of the resource by the first business premises.

13. The computerized method of claim 12, wherein the characteristic data comprises a third specialty classification and a forth specialty classification of the first business premises, and wherein the third specialty classification corresponds to a first market characteristic and the forth specialty classification corresponds to a second, different, market characteristic.

14. The computerized method of claim 12, wherein the characteristic data comprises a third specialty classification and a fourth specialty classification of the first business premises.

15. The computerized method of claim 14, wherein the third specialty classification corresponds to a first NAICS code and the forth specialty classification corresponds to a second, different, NAICS code.

16. The computerized method of claim 12, wherein the first specialty classification corresponds to a first sub-specialty classification.

17. The computer-implemented method of claim 12, wherein the usage data comprises at least one of electricity usage data, gas usage data, oil usage data, wood usage data, waste removal usage data, water usage data, sewer usage data, garbage removal usage data, recycling removal usage data, telephone usage data and broadband usage data.

18. A non-transitory computer readable medium encoded with instructions that when executed by the processor cause the processor to:

receive transmissions of usage data over a communications network of an advanced meter infrastructure system, wherein the transmissions are received through metering feeds from advanced meter infrastructure meters;

retrieve, over a network from electronic publications using computing interfaces for communicating over the network, characteristic data describing a first business premises, wherein the characteristic data comprises at least (i) a first specialty classification and (ii) a second specialty classification;

generate a similarity index comprising a set of coefficients used to augment criteria used to determine similarity between business premises, wherein a coefficient comprises a weight value to apply to a characteristic of a corresponding criterion;

select a set of second business premises by applying the similarity index to characteristics of a plurality of second business premises and the first specialty classification of the first business premises, wherein weight values of coefficients for the criteria are applied to corresponding characteristics of a second business premises to determine similarity of the second business premises in relation to the first business premises, wherein the second business premises is selected for inclusion within the set of second business premises;

in response to determining that a number of business premises in the set of second business premises is less than a threshold, (i) receive an adjustment of a parameter on a user interface to change an amount of similar business premises and in response thereto select one or more additional business premises associated with the second specialty classification of the first business premises and (ii) augment the set of second business premises with the one or more additional business premises;

generate a report that comprises usage data describing usage of a resource by the first business premises and usage data describing usage of the resource by the set of second business premises; and send the report to an account of the first business premises to cause the first business premises to perform energy reduction actions to reduce consumption of the resource by the first business premises.

19. A non-transitory computer readable medium encoded with instructions that when executed by the processor cause the processor to:

receive transmissions of usage data over a communications network of an advanced meter infrastructure system, wherein the transmissions are received through metering feeds from advanced meter infrastructure meters;

retrieve, over a network from electronic publications using computing interfaces for communicating over the network, characteristic data describing a first business premises, wherein the characteristic data comprises at least (i) a first specialty classification and (ii) a second specialty classification;

generate a similarity index comprising a set of coefficients used to augment criteria used to determine similarity between business premises, wherein a coefficient comprises a weight value to apply to a characteristic of a corresponding criterion;

select a set of second business premises by applying the similarity index to characteristics of a plurality of second business premises and the first specialty classification of the first business premises, wherein weight values of coefficients for the criteria are applied to corresponding characteristics of a second business premises to determine similarity of the second business premises in relation to the first business premises, wherein the second business premises is selected for inclusion within the set of second business premises;

in response to determining that a number of business premises in the set of second business premises is less than a threshold, (i) receive an adjustment of a parameter on a user interface to change an amount of similar business premises and in response thereto select one or more additional business premises associated with the second specialty classification of the first business premises and (ii) augment the set of second business premises with the one or more additional business premises;

generate a report that comprises usage data describing usage of the resource by the first business premises and usage data describing usage of the resource by the set of second business premises; and send the report electronically to an account of the first business premises to cause the first business premises to perform energy reduction actions to reduce consumption of the resource by the first business premises.

20. A computing system, comprising:
a processor; and
a memory comprising instructions that when executed by the processor cause the processor to:
receive transmissions of usage data over a communications network of an advanced meter infrastructure system, wherein the transmissions are received through metering feeds from advanced meter infrastructure meters;

retrieve, over a network from electronic publications using computing interfaces for communicating over the network, characteristic data describing a first business premises, wherein the characteristic data comprises at least (i) a first specialty classification that corresponds to at least one of a first North American Industry Classification System (NAICS) code or a first Standard Industrial Classification (SIC) code and (ii) a second specialty classification that corresponds to at least one of a second NAICS code or a second SIC code;

generate a similarity index comprising a set of coefficients used to augment criteria used to determine similarity between business premises, wherein a coefficient comprises a weight value to apply to a characteristic of a corresponding criterion;

select a set of second business premises by applying the similarity index to characteristics of a plurality of second business premises and the first specialty classification corresponding to at least one of the first NAICS code or the first SIC code of the first business premises, wherein weight values of coefficients for the criteria are applied to corresponding characteristics of a second business premises to determine similarity of the second business premises in relation to the first business premises, wherein the second business premises is selected for inclusion within the set of second business premises;

in response to determining that a number of business premises in the set of second business premises is less than a threshold, (i) adjust a parameter on a user interface to change an amount of similar business premises and in response thereto select one or more additional business premises associated with the second specialty classification corresponding to at least one of the second NAICS code or the second SIC code of the first business premises and (ii) augment the set of second business premises with the one or more additional business premises;

generate a report that comprises usage data describing usage of the resource by the first business premises and usage data describing usage of the resource by the set of second business premises; and send the report electronically to an account of the first business premises to cause the first business premises to perform energy reduction actions to reduce consumption of the resource by the first business premises.

21. The computing system of claim 20, wherein the first specialty classification corresponds to a first sub-specialty classification, wherein the second specialty classification corresponds to a second, different, sub-specialty classification, and wherein the first specialty classification is hierarchically related to the first sub-specialty classification.

22. The computerized method of claim 12, wherein sending the report includes sending the report via electronic mail to an email address or providing the report via a website for display on a webpage associated with a profile of the first business premises.

* * * * *